(12) United States Patent
Guarraci

(10) Patent No.: US 8,694,564 B2
(45) Date of Patent: Apr. 8, 2014

(54) METHOD AND SYSTEM FOR PROVIDING ON-DEMAND SERVICES THROUGH A VIRTUAL FILE SYSTEM AT A COMPUTING DEVICE

(75) Inventor: Brian J. Guarraci, Beijing (CN)

(73) Assignee: Beijing Innovation Works Technology Company Limited, Beijing (CN)

( * ) Notice: Subject to any disclaimer, the term of this patent is extended or adjusted under 35 U.S.C. 154(b) by 272 days.

(21) Appl. No.: 12/954,371

(22) Filed: Nov. 24, 2010

(65) Prior Publication Data

US 2011/0066668 A1  Mar. 17, 2011

Related U.S. Application Data

(63) Continuation of application No. 12/994,444, filed as application No. PCT/CN2010/076437 on Aug. 27, 2010.

(60) Provisional application No. 61/237,902, filed on Aug. 28, 2009.

(51) Int. Cl.
*G06F 12/00* (2006.01)
*G06F 17/30* (2006.01)

(52) U.S. Cl.
USPC .......................................... 707/831; 707/638

(58) Field of Classification Search
USPC .................. 707/831, 999.1, 999.204, 638
See application file for complete search history.

(56) References Cited

U.S. PATENT DOCUMENTS

| 5,151,989 | A | 9/1992 | Johnson et al. |
|---|---|---|---|
| 5,615,363 | A | 3/1997 | Jenness |
| 5,649,196 | A | 7/1997 | Woodhill et al. |
| 5,890,169 | A | 3/1999 | Wong et al. |
| 6,571,245 | B2 | 5/2003 | Huang et al. |
| 7,017,011 | B2 * | 3/2006 | Lesmanne et al. ............ 711/141 |
| 7,222,141 | B2 | 5/2007 | Zondervan et al. |
| 7,506,010 | B2 * | 3/2009 | Kulkarni et al. ...................... 1/1 |
| 7,529,778 | B1 * | 5/2009 | Dewey et al. ......................... 1/1 |

(Continued)

FOREIGN PATENT DOCUMENTS

| CN | 1481635 A | 3/2004 | ............. G06F 17/30 |
|---|---|---|---|
| CN | 101515273 A | 8/2009 | ............. G06F 17/30 |

OTHER PUBLICATIONS

International Search Report and Written Opinion for International Application No. PCT/CN2010/076437 mailed Dec. 9, 2010, 13 pages.

(Continued)

*Primary Examiner* — Cam Truong
(74) *Attorney, Agent, or Firm* — Morgan, Lewis & Bockius LLP

(57) ABSTRACT

A method of providing on-demand service through a virtual file system is implemented at a computing device. In response to receiving a request for a file associated with an instance of the virtual file system, the computing device checks the metadata of the requested file in the virtual file system to identify a first set of data blocks of the requested file that is not present at the computing device and retrieves the first set of data blocks from at least one of a plurality of storage devices associated with the virtual file system. The computing device generates a copy of the requested file using the retrieved first set of data blocks and returns the generated copy of the requested file to the requesting application or user.

19 Claims, 29 Drawing Sheets

(56) References Cited

U.S. PATENT DOCUMENTS

| | | |
|---|---|---|
| 7,533,133 B1 * | 5/2009 | Lanzatella et al. ............... 1/1 |
| 7,549,089 B1 | 6/2009 | Kimmel et al. |
| 7,603,391 B1 | 10/2009 | Federwisch et al. |
| 7,707,165 B1 | 4/2010 | Jiang et al. |
| 2002/0059245 A1 | 5/2002 | Zakharov et al. |
| 2002/0082858 A1 | 6/2002 | Heddaya et al. |
| 2002/0161973 A1 | 10/2002 | Ulrich et al. |
| 2003/0135514 A1 | 7/2003 | Patel et al. |
| 2004/0133570 A1 | 7/2004 | Soltis ............................... 707/3 |
| 2005/0065986 A1 | 3/2005 | Bixby et al. |
| 2005/0193245 A1 | 9/2005 | Hayden et al. |
| 2005/0216532 A1 * | 9/2005 | Lallier ........................... 707/204 |
| 2006/0047716 A1 * | 3/2006 | Keith, Jr. ....................... 707/203 |
| 2006/0069665 A1 | 3/2006 | Yamakawa et al. |
| 2006/0195490 A1 | 8/2006 | Toebes et al. |
| 2006/0224843 A1 | 10/2006 | Rao et al. |
| 2006/0271606 A1 | 11/2006 | Tewksbary |
| 2007/0050543 A1 | 3/2007 | Pomerantz |
| 2007/0156842 A1 * | 7/2007 | Vermeulen et al. ........... 709/217 |
| 2007/0292021 A1 * | 12/2007 | Caruso et al. ................. 382/166 |
| 2008/0010322 A1 * | 1/2008 | Lee et al. ...................... 707/201 |
| 2008/0028007 A1 | 1/2008 | Ishii et al. |
| 2008/0059541 A1 | 3/2008 | Fachan et al. |
| 2008/0077634 A1 | 3/2008 | Quakenbush |
| 2008/0086422 A1 | 4/2008 | Wolff et al. |
| 2008/0126704 A1 | 5/2008 | Ulrich et al. |
| 2009/0055607 A1 | 2/2009 | Schack et al. |
| 2009/0208190 A1 | 8/2009 | Takakuwa et al. |
| 2009/0216815 A1 | 8/2009 | Braginsky et al. |
| 2009/0271412 A1 | 10/2009 | Lacapra et al. |
| 2010/0174731 A1 | 7/2010 | Vermeulen et al. |
| 2010/0306171 A1 | 12/2010 | Antos et al. |
| 2010/0310228 A1 | 12/2010 | Kobayashi et al. |
| 2011/0016353 A1 | 1/2011 | Mikesell et al. |

OTHER PUBLICATIONS

Guarraci, Final Office Action, U.S. Appl. No. 12/954,386, Nov. 15, 2012, 39 pgs.

Guarraci, Notice of Allowance, U.S. Appl. No. 12/954,386, Jun. 24, 2013, 11 pgs.

Guarraci, Notice of Allowance, U.S. Appl. No. 12/954,399, May 24, 2013, 16 pgs.

Guarraci, Notice of Allowance, U.S. Appl. No. 12/954,414, Mar. 28, 2013, 16 pgs.

Guarraci, Notice of Allowance, U.S. Appl. No. 12/994,444, Mar. 14, 2013, 17 pgs.

Guarraci, Office Action, U.S. Appl. No. 12/954,386, Mar. 28, 2012, 33 pgs.

Guarraci, Office Action, U.S. Appl. No. 12/954,399, Dec. 3, 2012, 23 pgs.

Guarraci, Office Action, U.S. Appl. No. 12/954,399, Apr. 13, 2012, 15 pgs.

Guarraci, Office Action, U.S. Appl. No. 12/954,414, Nov. 16, 2012, 25 pgs.

Guarraci, Office Action, U.S. Appl. No. 12/954,414, Apr. 26, 2012, 30 pgs.

Guarraci, Office Action, U.S. Appl. No. 12/994,444, Jun. 11, 2012, 13 pgs.

Guarraci, Office Action, U.S. Appl. No. 12/994,444, Nov. 21, 2012, 20 pgs.

\* cited by examiner

Structure of A block

Structure of A Data Volume

Intra-file Parity Computation

Inter-file Parity Protection

○ Harmony — test0825

| File | Volume | Help |

Home

| Name ▲ | Status | Size | Type | Date Modified |
|---|---|---|---|---|
| Cloud_Intro | Computer | 120 KB | PPTX File | 8/3/2010 3:16:09 PM |
| IMG_0289 | Computer | 400 KB | JPG File | 5/9/2010 11:31:25 AM |
| IMG_0290 | Computer | 413 KB | JPG File | 5/9/2010 11:31:25 AM |
| IMG_0291 | Computer | 439 KB | JPG File | 5/9/2010 11:31:24 AM |
| IMG_0292 | Computer | 435 KB | JPG File | 5/9/2010 11:31:24 AM |
| IMG_0293 | Computer | 313 KB | JPG File | 5/9/2010 11:31:23 AM |
| IMG_0294 | Computer | 357 KB | JPG File | 5/9/2010 11:31:23 AM |
| IMG_0297 | Added | 374 KB | JPG File | 5/9/2010 11:31:21 AM |
| IMG_0300 | Added | 318 KB | JPG File | 5/9/2010 11:31:19 AM |

841
843

| Type | Description |
|---|---|
| Local Storage · 1 | C:\Users\Brian\AppData\Roaming\Harmony\Storage |
| Nebula Storage · 1 | http://10.18.121.212:8080/service - unilium |

| | | | | |
|---|---|---|---|---|
| ○ Harmony — test0825 | | | | |
| File | Volume | Help | | |
| Home | | | | |
| Name ▲ | Status | Size Type | Date Modified | |
| 🗎 Cloud_Intro | Computer | 120 KB PPTX File | 8/3/2010 3:16:09 PM | |
| 🖼 IMG_0289 | Computer | 400 KB JPG File | 5/9/2010 11:31:25 AM | |
| 🖼 IMG_0290 | Computer | 413 KB JPG File | 5/9/2010 11:31:25 AM | |
| 🖼 IMG_0291 | Computer | 439 KB JPG File | 5/9/2010 11:31:24 AM | |
| 🖼 IMG_0292 | Computer | 435 KB JPG File | 5/9/2010 11:31:24 AM | |
| 🖼 IMG_0293 | Computer | 313 KB JPG File | 5/9/2010 11:31:23 AM | |
| 🖼 IMG_0294 | Computer | 357 KB JPG File | 5/9/2010 11:31:23 AM | |
| 🖼 IMG_0297  845 | Computer | 374 KB JPG File | 5/9/2010 11:31:21 AM | |
| 🖼 IMG_0300 | Computer | 318 KB JPG File | 5/9/2010 11:31:19 AM | |
| 847 | | | | |

| Type | Tier | Description |
|---|---|---|
| Local Storage | 1 | C:\Users\Brian\AppData\Roaming\Harmony\Storage |
| Nebula Storage | 1 | http://10.18.121.212:8080/service - unilium |

Fig. 8D

| ○ Harmony — test0825 | | | | |
|---|---|---|---|---|
| File | Volume | Help | | |
| Home | | | | |
| Name ▲ | Status | Size | Type | Date Modified |
| 🖼 Cloud_Intro | Computer | 120 KB | PPTX File | 8/3/2010 3:16:09 PM |
| 🖼 IMG_0289 | Computer | 400 KB | JPG File | 5/9/2010 11:31:25 AM |
| 🖼 IMG_0290 | Computer | 413 KB | JPG File | 5/9/2010 11:31:25 AM |
| 🖼 IMG_0291 | Computer | 439 KB | JPG File | 5/9/2010 11:31:24 AM |
| 🖼 IMG_0292 | Computer | 435 KB | JPG File | 5/9/2010 11:31:24 AM |
| 🖼 IMG_0293 | Computer | 313 KB | JPG File | 5/9/2010 11:31:23 AM |
| 🖼 IMG_0294 | Computer | 357 KB | JPG File | 5/9/2010 11:31:23 AM |
| 🖼 IMG_0297 _851_ | Computer | 374 KB | JPG File | 5/9/2010 11:31:21 AM |
| 🖼 IMG_0300 | Cloud | 318 KB | JPG File | 5/9/2010 11:31:19 AM |

_853_

| Type | Tier | Description |
|---|---|---|
| Local Storage | 1 | C:\Users\Brian\AppData\Roaming\Harmony\Storage |
| Nebula Storage | 1 | http://10.18.121.212:8080/service - unilium |

Fig. 8E

METHOD AND SYSTEM FOR PROVIDING ON-DEMAND SERVICES THROUGH A VIRTUAL FILE SYSTEM AT A COMPUTING DEVICE

RELATED APPLICATIONS

This application is a Continuation Application of U.S. patent application Ser. No. 12/994,444 filed on Nov. 23, 2010, which is a National Stage Application filed under 35 U.S.C §371 of PCT Patent Application Serial No. PCT/CN2010/076437 filed on Aug. 27, 2010, which claims the benefit of and priority to U.S. Provisional Patent Application No. 61/237,902, "Distributed fault-tolerant content addressable storage based file system with revision control utilizing heterogeneous data storage devices", filed on Aug. 28, 2009, all of which are hereby incorporated by reference in their entirety.

TECHNICAL FIELD

The disclosed embodiments relate generally to cloud storage, and more specifically to method and system for managing a distributed storage system through a virtual file system.

BACKGROUND

Cloud computing is deemed as a paradigm shift from the mainframe or client-server based information service. Because the details of the technology infrastructure that supports cloud computing are hidden "in the cloud," a user who uses the services based on cloud computing is not required to have the expertise in, or control over, the technology infrastructure.

Among the cloud computing based services, cloud storage is one that receives more and more attention with the dramatic expansion of data accumulation speed even at an individual person's level. For example, most of today's smart phones are equipped with digital camera or even video camera for generating high-resolution multimedia content. Thus, the large volume of data generated by a user of a smart phone can easily fill up its local storage space (e.g., a flash memory card) within a short period of time as well as other local storage devices (e.g., a computer hard drive) that the user has access to. To avoid potential data loss due to a fatal device failure, the user may have to install special software application on its computer to manage the large volume of data, e.g., moving the data from one device to another device or replicating data to ensure reliability. This process is often tedious and time-consuming.

A cloud storage based solution addresses this data explosion problem by offering an Internet-based storage service within a web interface through which different subscribers can upload their data into remote storage devices managed by a third-party that has the technology and resources for maintaining the integrity of the uploaded data. But because different third-parties often use different technologies, it remains a challenge for an individual user to integrate the cloud storage and the local storage in a streamlined fashion.

SUMMARY

The above deficiencies and other problems associated with integrating the cloud storage and the local storage in a streamlined fashion are addressed by the disclosed embodiments.

In accordance with some embodiments, a computer-implemented method for forming a virtual file system associated with a distributed storage system is implemented at a computing device having one or more processors and memory. The memory stores one or more programs for execution by the one or more processors on the computing device, which is associated with a distributed storage system that includes a plurality of storage devices.

The computing device receives a request for forming a virtual file system, which is associated with a plurality of storage devices. The computing device retrieves one or more metadata blocks from the plurality of storage devices, each metadata block including metadata associated with a respective component of the virtual file system. The computing device renders a commit tree for the virtual file system by processing the retrieved metadata blocks in a predefined order. In some embodiments, the commit tree includes a plurality of directory nodes and file nodes, each directory node or file node having metadata corresponding to a respective directory or file of the virtual file system. The computing device builds an instance of the virtual file system by traversing the plurality of directory nodes and file nodes in a recursive manner. In some embodiments, for a respective directory node, the computing device creates a directory in accordance with the metadata associated with the directory node; for a respective file node, the computing device retrieves one or more data blocks from the plurality of storage devices in accordance with the metadata associated with the file node and creates a file using the retrieved data blocks.

In accordance with some embodiments, a computing device in association with a distributed storage system that includes a plurality of storage devices includes one or more processors, memory, and one or more programs stored in the memory for execution by the one or more processors. The one or more programs include instructions for: receiving a request for forming a virtual file system, wherein the virtual file system is associated with a plurality of storage devices; retrieving one or more metadata blocks from the plurality of storage devices, wherein each metadata block includes metadata associated with a respective component of the virtual file system; rendering a commit tree for the virtual file system by processing the retrieved metadata blocks in a predefined order, wherein the commit tree includes a plurality of directory nodes and file nodes, each directory node or file node having metadata corresponding to a respective directory or file of the virtual file system; and building an instance of the virtual file system by traversing the plurality of directory nodes and file nodes in a recursive manner, further including: creating a directory in accordance with the metadata associated with a respective directory node, and retrieving one or more data blocks from the plurality of storage devices in accordance with the metadata associated with a respective file node and creating a file using the retrieved data blocks.

In accordance with some embodiments, a computer readable storage medium stores one or more programs configured for execution by a computing device having one or more processors and memory storing one or more programs for execution by the one or more processors in association with a distributed storage system that includes a plurality of storage devices. The one or more programs comprise instructions to: receive a request for forming a virtual file system, wherein the virtual file system is associated with a plurality of storage devices; retrieve one or more metadata blocks from the plurality of storage devices, wherein each metadata block includes metadata associated with a respective component of the virtual file system; create a commit tree for the virtual file system by processing the retrieved metadata blocks in a predefined order, wherein the commit tree includes a plurality of directory nodes and file nodes, each directory node or file node having metadata corresponding to a respective directory or file of the virtual file system; and build an instance of the virtual file system by traversing the plurality of directory nodes and file nodes in a recursive manner, further including: creating a directory in accordance with the metadata associated with a respective directory node, and retrieving one or more data blocks from the plurality of storage devices in accordance with the metadata associated with a respective file node and creating a file using the retrieved data blocks.

In accordance with some embodiments, a computer-implemented method for fetching data associated with a file from a distributed storage system is implemented at a computing device having one or more processors and memory. The memory stores one or more programs for execution by the one or more processors on the computing device, which is associated with a distributed storage system that includes a plurality of storage devices.

The computing device receives from an application a file request through an instance of a virtual file system. In some embodiments, the virtual file system is associated with a plurality of storage devices and includes metadata associated with the requested file. The computing device checks the metadata to determine that a first set of data blocks of the requested file is present at the computing device and a second set of data blocks of the requested file is not present at the computing device. The computing device retrieves the second set of data blocks from the plurality of storage devices. The computing device rebuilds an instance of the requested file using the first set of data blocks and the retrieved second set of data blocks. The computing device updates the metadata of the requested file to reflect the presence of the retrieved second set of data blocks. The computing device serves the rebuilt instance of the requested file to the requesting application.

In accordance with some embodiments, a computing device in association with a distributed storage system that includes a plurality of storage devices includes one or more processors, memory, and one or more programs stored in the memory for execution by the one or more processors. The one or more programs include instructions for: receiving from an application a file request through an instance of a virtual file system, wherein the virtual file system is associated with a plurality of storage devices and includes metadata associated with the requested file; checking the metadata to determine that a first set of data blocks of the requested file is present at the computing device and a second set of data blocks of the requested file is not present at the computing device; retrieving the second set of data blocks from the plurality of storage devices; rebuilding an instance of the requested file using the first set of data blocks and the retrieved second set of data blocks; updating the metadata of the requested file to reflect the presence of the retrieved second set of data blocks; and serving the rebuilt instance of the requested file to the requesting application.

In accordance with some embodiments, a computer readable storage medium stores one or more programs configured for execution by a computing device having one or more processors and memory storing one or more programs for execution by the one or more processors in association with a distributed storage system that includes a plurality of storage devices. The one or more programs comprise instructions to: receive from an application a file request through an instance of a virtual file system, wherein the virtual file system is associated with a plurality of storage devices and includes metadata associated with the requested file; check the metadata to determine that a first set of data blocks of the requested file is present at the computing device and a second set of data blocks of the requested file is not present at the computing device; retrieve the second set of data blocks from the plurality of storage devices; rebuild an instance of the requested file using the first set of data blocks and the retrieved second set of data blocks; update the metadata of the requested file to reflect the presence of the retrieved second set of data blocks; and serve the rebuilt instance of the requested file to the requesting application.

In accordance with some embodiments, a computer-implemented method for performing automatic differential data compression in association with storing a file at a distributed storage system is implemented at a computing device having one or more processors and memory. The memory stores one or more programs for execution by the one or more processors on the computing device, which is associated with a distributed storage system that includes a plurality of storage devices.

The computing device receives a request to create a revision of a virtual file system in a storage device. In some embodiments, the virtual file system has a commit tree that includes a plurality of directory nodes and file nodes, each directory node or file node having metadata corresponding to a respective directory or file of the virtual file system. For each of the plurality of directory nodes and file nodes, the computing device generates an object by serializing the tree node's associated metadata in a predefined order and creates an object ID from the serialized metadata. The computing device stores the object at the storage virtual file system and inserts the object ID into the object-storage mapping table. The computing device stores the object-storage mapping table at the storage device. For each content block associated with a respective file of the virtual file system, the computing device creates a block ID from the content block. The computing device stores the content block at the storage device if the block ID is not present in a content block-storage mapping table associated with the virtual file system and inserts the block ID into the content block-storage mapping table. The computing device stores the content block-storage mapping table at the storage device.

In accordance with some embodiments, a computing device in association with a distributed storage system that includes a plurality of storage devices includes one or more processors, memory, and one or more programs stored in the memory for execution by the one or more processors. The one or more programs include instructions for: receiving a request to create a revision of a virtual file system in a storage device, wherein the virtual file system has a commit tree that includes a plurality of directory nodes and file nodes, each directory node or file node having metadata corresponding to a respective directory or file of the virtual file system; for each of the plurality of directory nodes and file nodes, generating an object by serializing the tree node's associated metadata in a predefined order and creating an object ID from the serialized metadata; and storing the object at the storage device if the object ID is not present in an object-storage mapping table associated with the virtual file system and inserting the object ID into the object-storage mapping table; storing the object-storage mapping table at the storage device; for each content block associated with a respective file of the virtual file system, creating a block ID from the content block; storing the content block at the storage device if the block ID is not present in a content block-storage mapping table associated with the virtual file system and inserting the block ID into the content block-storage mapping table; and storing the content block-storage mapping table at the storage device.

In accordance with some embodiments, a computer readable storage medium stores one or more programs configured for execution by a computing device having one or more processors and memory storing one or more programs for execution by the one or more processors in association with a distributed storage system that includes a plurality of storage devices. The one or more programs comprise instructions to: receive a request to create a revision of a virtual file system in a storage device, wherein the virtual file system has a commit tree that includes a plurality of directory nodes and file nodes, each directory node or file node having metadata corresponding to a respective directory or file of the virtual file system; for each of the plurality of directory nodes and file nodes, generate an object by serializing the tree node's associated metadata in a predefined order and create an object ID from the serialized metadata; and store the object at the storage device if the object ID is not present in an object-storage mapping table associated with the virtual file system and insert the object ID into the object-storage mapping table; store the object-storage mapping table at the storage device; for each content block associated with a respective file of the virtual file system, create a block ID from the content block; store the content block at the storage device if the block ID is not present in a content block-storage mapping table associated with the virtual file system and insert the block ID into the content block-storage mapping table; and store the content block-storage mapping table at the storage device.

In accordance with some embodiments, a computer-implemented method for computing parity data associated with a distributed storage system is implemented at a computing device having one or more processors and memory. The memory stores one or more programs for execution by the one or more processors on the computing device, which is associated with a distributed storage system that includes a plurality of storage devices.

The computing device receives a request for a file, which is associated with a set of data segments. In response, the computing device attempts to retrieve the set of data segments from one or more storage devices communicatively connected to the computing device. For each missing data segment that the computing device fails to retrieve, the computing device identifies a data recovery scheme. The data recovery scheme involves at least one base data segment that is present at the computing device and at least one parity data segment that is located at one of the storage devices remote from the computing device. After retrieving the at least one parity data segment from the storage devices, the computing device computes the missing data segment by applying the data recovery scheme to the at least one base data segment and the at least one parity data segment retrieved from the storage devices and builds the requested file using the computed missing data segments.

In accordance with some embodiments, a computing device in association with a distributed storage system that includes a plurality of storage devices includes one or more processors, memory, and one or more programs stored in the memory for execution by the one or more processors. The one or more programs include instructions for: receiving a request for a file, where in the file is associated with a set of data segments; retrieving the set of data segments from one or more storage devices communicatively connected to the computing device; for each missing data segment that the computing device fails to retrieve, identifying a data recovery scheme, wherein the data recovery scheme involves at least one base data segment that is present at the computing device and at least one parity data segment that is located at one of the storage devices remote from the computing device; retrieving the at least one parity data segment from the storage devices; and computing the missing data segment by applying the data recovery scheme to the at least one base data segment and the at least one parity data segment retrieved from the storage devices; and building the requested file using the computed missing data segments.

In accordance with some embodiments, a computer readable storage medium stores one or more programs configured for execution by a computing device having one or more processors and memory storing one or more programs for execution by the one or more processors in association with a distributed storage system that includes a plurality of storage devices. The one or more programs comprise instructions to: receive a request for a file, where in the file is associated with a set of data segments; retrieve the set of data segments from one or more storage devices communicatively connected to the computing device; for each missing data segment that the computing device fails to retrieve, identifying a data recovery scheme, wherein the data recovery scheme involves at least one base data segment that is present at the computing device and at least one parity data segment that is located at one of the storage devices remote from the computing device; retrieving the at least one parity data segment from the storage devices; and computing the missing data segment by applying the data recovery scheme to the at least one base data segment and the at least one parity data segment retrieved from the storage devices; and building the requested file using the computed missing data segments.

In accordance with some embodiments, a computer-implemented method for merging two or more revisions to a virtual file system associated with a distributed storage system is implemented at a computing device having one or more processors and memory. The memory stores one or more programs for execution by the one or more processors on the computing device, which is associated with a distributed storage system that includes a plurality of storage devices. The virtual file system has an associated commit tree corresponding to a first revision of the virtual file system.

The computing device retrieves one or more metadata blocks from a plurality of storage devices. The metadata blocks are associated with a second revision of the virtual file system. The computing device updates the commit tree by processing the retrieved metadata blocks in a predefined order. In particular, the computing device replaces a first component of the virtual file system corresponding to the first revision of the commit tree with an associated component of the virtual file system corresponding to the second revision of the commit tree if a first predefined set of conditions is met; and the computing device identifies a second component of the virtual file system corresponding to the first revision of the commit tree as being associated with a component of the virtual file system corresponding to the second revision of the commit tree if a second predefined set of conditions is met.

In accordance with some embodiments, a computing device on which a virtual file system operates in association with a distributed storage system that includes a plurality of storage devices includes one or more processors, memory, and one or more programs stored in the memory for execution by the one or more processors. The virtual file system has an associated commit tree corresponding to a first revision of the virtual file system. The one or more programs include instructions for: retrieving one or more metadata blocks from a plurality of storage devices, wherein the metadata blocks are associated with a second revision of the virtual file system; and updating the commit tree by processing the retrieved metadata blocks in a predefined order, further including: replacing a first component of the virtual file system corresponding to the first revision of the commit tree with an associated component of the virtual file system corresponding to the second revision of the commit tree if a first predefined set of conditions is met; and identifying a second component of the virtual file system corresponding to the first revision of the commit tree as being associated with a component of the virtual file system corresponding to the second revision of the commit tree if a second predefined set of conditions is met.

In accordance with some embodiments, a computer readable storage medium stores one or more programs configured for execution by a computing device having one or more processors and memory storing one or more programs for execution by the one or more processors in association with a virtual file system and a distributed storage system that includes a plurality of storage devices. The one or more programs comprise instructions to: retrieve one or more metadata blocks from a plurality of storage devices, wherein the metadata blocks are associated with a second revision of the virtual file system; and update the commit tree by processing the retrieved metadata blocks in a predefined order, further including: replacing a first component of the virtual file system corresponding to the first revision of the commit tree with an associated component of the virtual file system corresponding to the second revision of the commit tree if a first predefined set of conditions is met; and identifying a second component of the virtual file system corresponding to the first revision of the commit tree as being associated with a component of the virtual file system corresponding to the second revision of the commit tree if a second predefined set of conditions is met.

Thus, methods and systems are provided that make it more convenient and more efficient for a computing device to synchronize local storage with a distributed storage system including a plurality of storage devices (e.g., a storage cloud) through a virtual file system. From a user's perspective, the virtual file system acts like a hard drive, except the data is stored elsewhere. The virtual file system provides the flexibility for a user to access its data from multiple computing devices while giving the user a familiar view of the user's files. By unifying a user's storage space, the virtual file system makes available to the user the unused space while implementing multiple protection mechanisms for the user's data. In addition, the virtual file system simplifies data migration between storage devices hosted by different service providers by allowing a user to add new service providers and/or drop existing service providers in response to service price changes, location changes, network availability changes, etc. For example, with the availability of large hard drives, the virtual file system allows a user to create a personal storage cloud by combining the local hard drives with the on-line storage services together so that the user can easily manage its data archives. By doing so, the virtual file system provides a user the same experience, online or offline. The virtual file system's built-in block management scheme uses both delta compression and block-level content addressable storage (CAS) to minimize duplication across files. The virtual file system automatically creates versions of every file it manages so that a user can go back to any version of a file in the file history or get an entire set of files at a particular moment. In sum, more efficient synchronization results in a user having access to the updated data at the computing device more quickly; and more efficient usage of the network bandwidth also reduces the risk of network traffic jam, leaving more bandwidth available for other tasks.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 8A to 8F are exemplary screenshots of a virtual file system according to some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first set of data blocks could be termed as a second set of data blocks, and, similarly, a second set of data blocks could be termed as a first set of data blocks, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition] is detected" may be construed to mean "upon determining" or "in response to determining" or "upon detecting [the stated condition or event]" or "in response to detecting [the stated condition or event]," depending on the context.

Figure 1A:
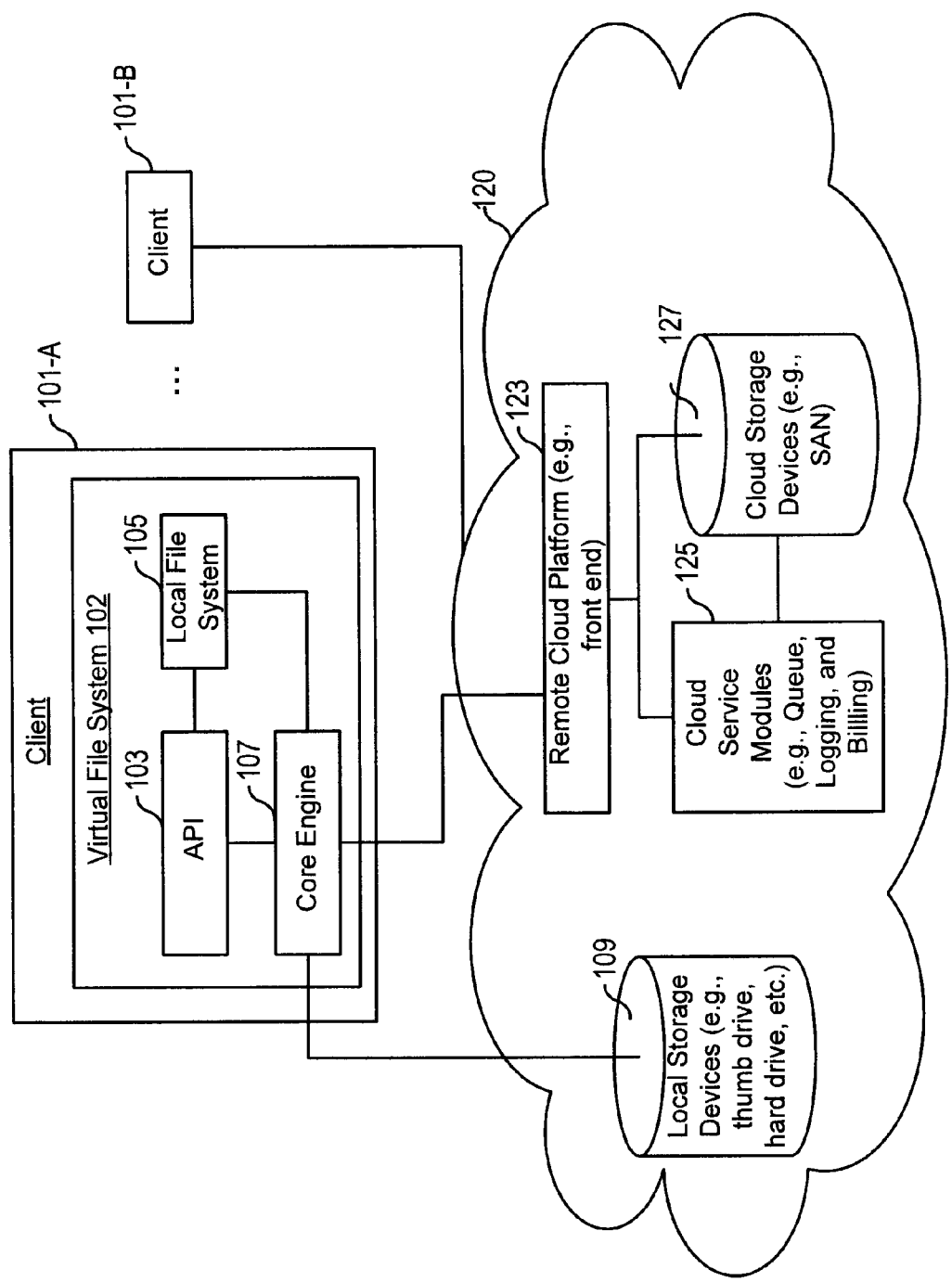
FIG. 1A is a block diagram illustrating a plurality of computing devices, each including a virtual file system, that are communicatively connected to a distributed storage system according to some embodiments.

FIG. 1A is a block diagram illustrating a plurality of computing devices, each including a virtual file system, that are communicatively connected to a distributed storage system according to some embodiments. In some embodiments, a computing device is a laptop/desktop/tablet computer or a portable communication device such as a mobile telephone. For simplification, a computing device may be referred to as "a client" or "a client computer" throughout the specification.

As shown in FIG. 1A, clients 101-A and 101-B are communicatively connected to a storage cloud 120, each client including a virtual file system 102. In some embodiments, the virtual file system includes an application user interface (API) 103, a local file system 105, and a core engine 107. The API 103 is a software application for accessing the storage cloud 120 through the core engine 107. In some embodiments, the API 103 is an application dedicated for this purpose. In some embodiments, the API 103 is an application (e.g., a web browser application) that can perform multiple functions including accessing the storage cloud 120. In some embodiments, the local file system 105 is the file system associated with the operating system (e.g., UNIX, Windows, or Linux, etc.) running on the client 101. For example, a user can use the local file system 105 to access files not managed by the virtual file system 102. The core engine 107 refers to a set of application modules that are responsible for managing different aspects of the virtual file system 102, such as retrieving files from a remote storage device, synchronizing one copy of a file stored at the client 101 with another copy of the same file stored at a remote storage device, etc. A more detailed description of the core engine 107 is provided below in connection with FIG. 1D.

In some embodiments, the storage cloud 120 is a distributed, heterogeneous storage system including multiple types of storage devices such as local storage devices 109 (e.g., thumb drive, hard drive, network attached storage (NAS), etc.) and remote (and often distributed) cloud storage devices. In other words, the term "cloud" in this application has a broader scope that may cover storage devices that are physically local to or remote from the virtual file system. In some embodiments, the remote cloud storage devices is a cloud storage service provided by a third-party (e.g., Amazon S3). In some embodiments, the cloud storage service includes a remote cloud platform 123, a set of cloud service modules 125, and a set of cloud storage devices 127. The remote cloud platform is typically a front end accessible through a web server. The cloud service modules 125 are responsible for performing operations (e.g., queuing, logging, billing, etc.) in support of the storage service. The cloud storage devices are associated with a hardware architecture (e.g., storage area network) that supports massive data storage/access through network connections such as Internet.

In some embodiments, a user of the virtual file system 102, which may be a person or a software application, submits a request for a file to the API 103. In response to the request, the API 103 checks if the requested file is available at the local file system 105. If so, it returns the requested file to the requesting user. If not, the API 103 may forward the file request to the core engine 107. As will be explained in detail below, the core engine 107 determines whether or not and how to retrieve information associated with the file (e.g., metadata and data) from a storage device within the storage cloud 120. After receiving the information, the core engine 107 then rebuilds the requested file in the local file system 105 and makes it available for the user to access. Upon detection of the user's updates to the file, the core engine 107 then generates a new revision of the file and synchronizes the revised file including its metadata and data with one or more storage devices associated with the storage cloud 120 to make sure that all the user updates are appropriately saved and protected against potential file loss and/or unauthorized access. Note that the terms "revision" and "version" are used interchangeably throughout the specification.

Figure 1B:
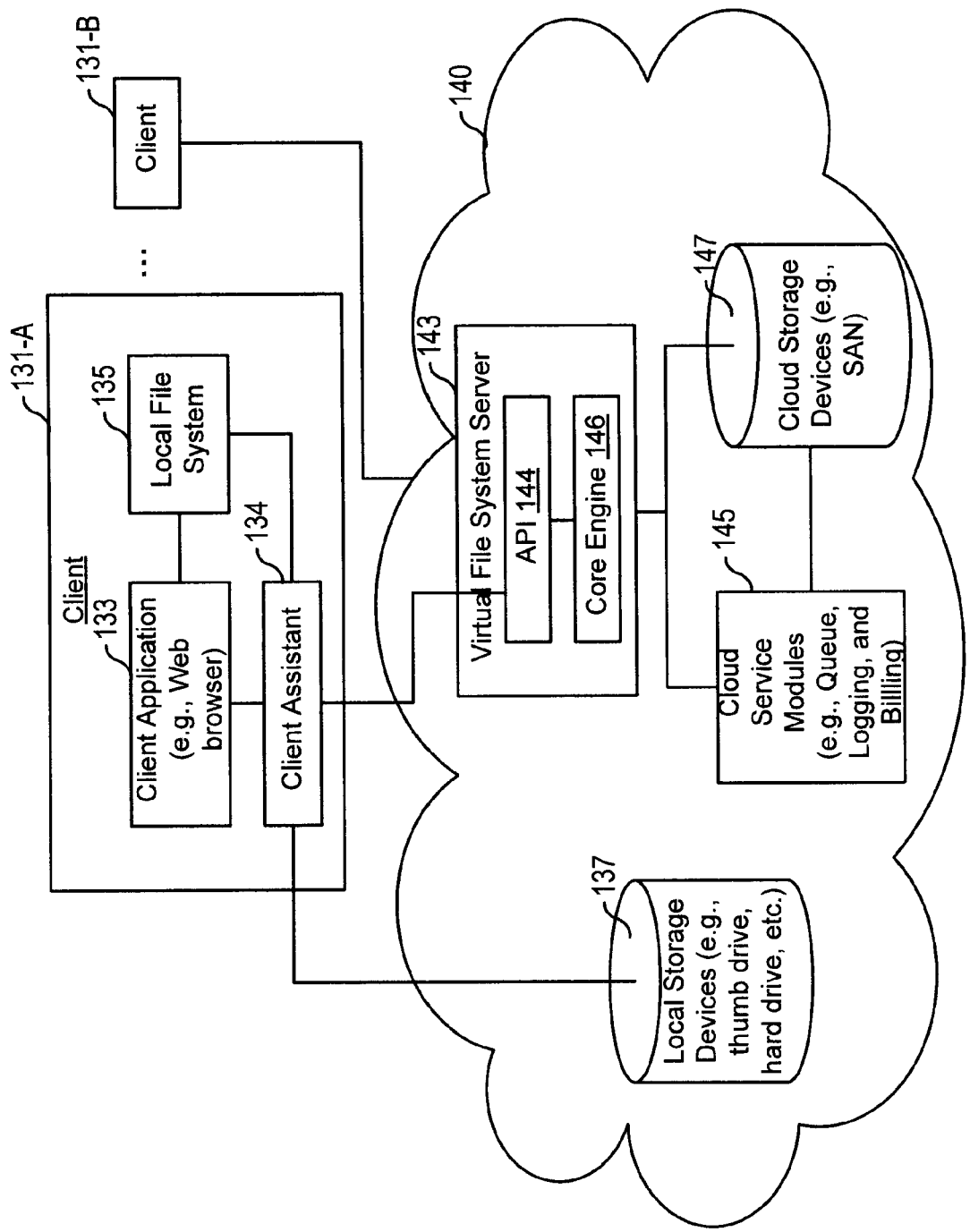
FIG. 1B is a block diagram illustrating a plurality of computing devices that are communicatively connected to a distributed storage system that includes a virtual file system according to some embodiments.

FIG. 1B is a block diagram illustrating a plurality of computing devices that are communicatively connected to a distributed storage system that includes a virtual file system according to some embodiments. Note that the system infrastructure shown in FIG. 1B is similar to the one shown in FIG. 1A in many aspects except that the virtual file system is moved from the client side into the storage cloud 140.

In particular, there is a virtual file system server 143 in the storage cloud 140 for processing files requests from different clients 131. The virtual file system server 143 further includes an API 144 and a core engine 146 for providing the cloud storage service as described above in connection with FIG. 1A using the cloud service modules 145 and the cloud storage devices 147. In some embodiments, a client 131 includes a client application 133 (e.g., a web browser) for receiving file requests and serving the requested files, a client assistant 134 (e.g., a web browser plug-in application) for processing the file requests including storing the requested files at a location within the local file system 135. In some embodiments, the client assistant 134 receives instructions from the virtual file system server 143 for storing information associated with a file in the local storage devices 137 that are part of the storage cloud 140 but are located physically close to the client 131-A.

In some embodiments, the system architecture shown in FIG. 1B is referred to as a thin-client or zero-footprint deployment of the virtual file system because most of the transactions such as those performed by the core engine 146 do not happen on the client side but within the storage cloud 140. As such, the number of dedicated software applications on the client side can be minimized. In some embodiments, this system architecture is better suited for those computing devices with limited capacity (e.g., a mobile phone or a personal digital assistant).

Figure 1C:
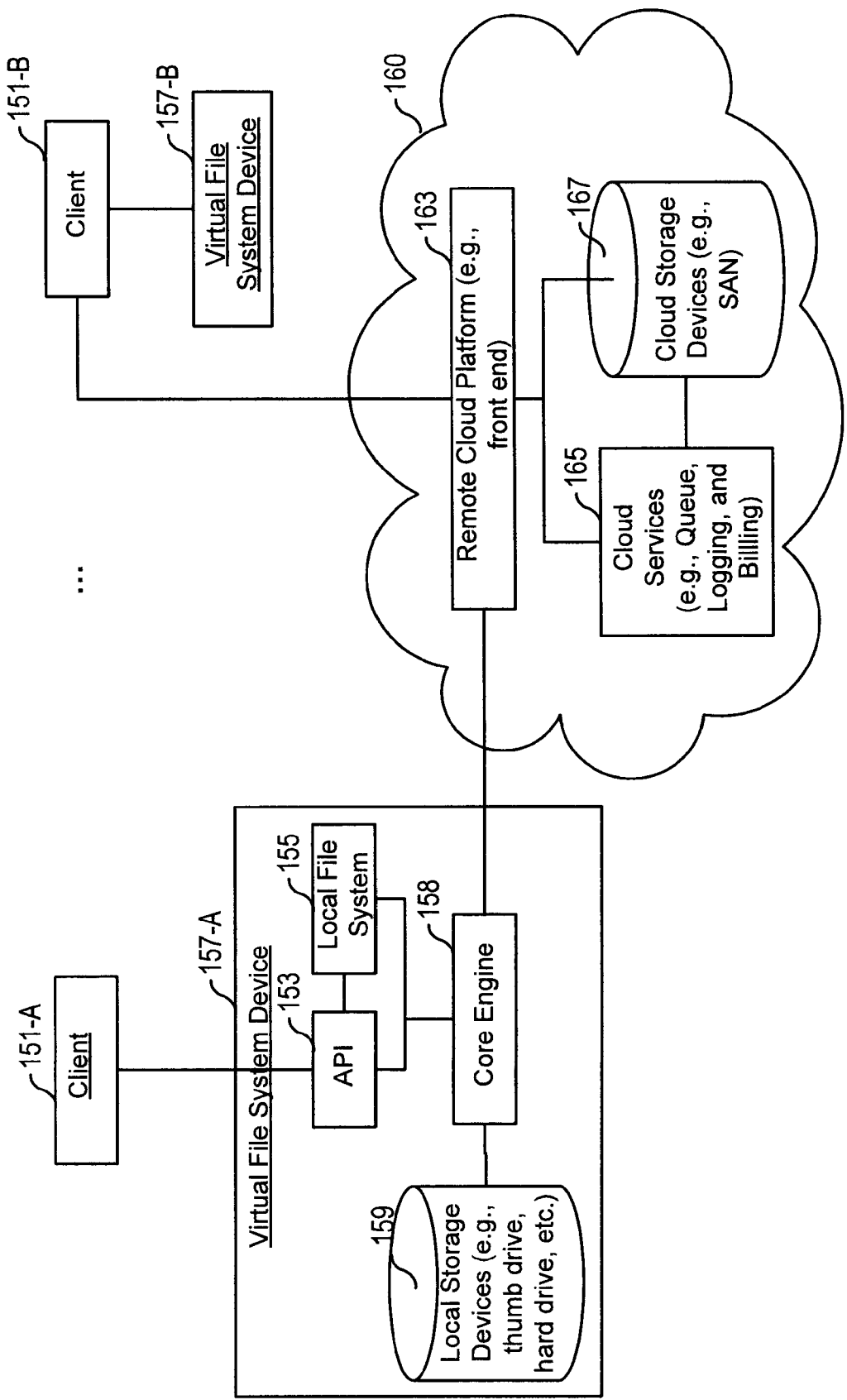
FIG. 1C is a block diagram illustrating a plurality of computing devices, each having an embedded virtual file system device, that are communicatively connected to a distributed storage system according to some embodiments.

FIG. 1C is a block diagram illustrating a plurality of computing devices, each having an embedded virtual file system device, that are communicatively connected to a distributed storage system according to some embodiments. Compared with the other embodiments described above, FIG. 1C depicts a virtual file system device 157 that is communicatively connected to a client 151 and to a storage cloud 160. In some embodiments, the virtual file system device 157 is an embedded system or a standalone device that includes processors, memory, and software applications like the API 153, the local file system 155, and the core engine 158. The functionalities of these applications within the virtual file system device 157 are similar to their counterparts described above. A user can attach the virtual file system device 157 to his or her personal computer. The virtual file system device 157 is able to receive a file request from a client 151 (e.g., a PC) and process them by retrieving the requested file from the storage cloud 160 or its local storage device 159 and returning the file to the client.

It is noted that the system architecture described above in connection with FIGS. 1A-1C are for illustrative purpose and one skilled in the art would be able to develop other system architecture based on the teachings herein with no difficulty. It is further noted that the different types of system architecture described above are by no means mutually exclusively. It is possible for a hybrid virtual file system to combine the different types of architecture by leveraging their respective advantages. For example, a client may have a virtual file system shown in FIG. 1A while allowing a user to submit file requests through a web server shown in FIG. 1B.

Figure 1D:
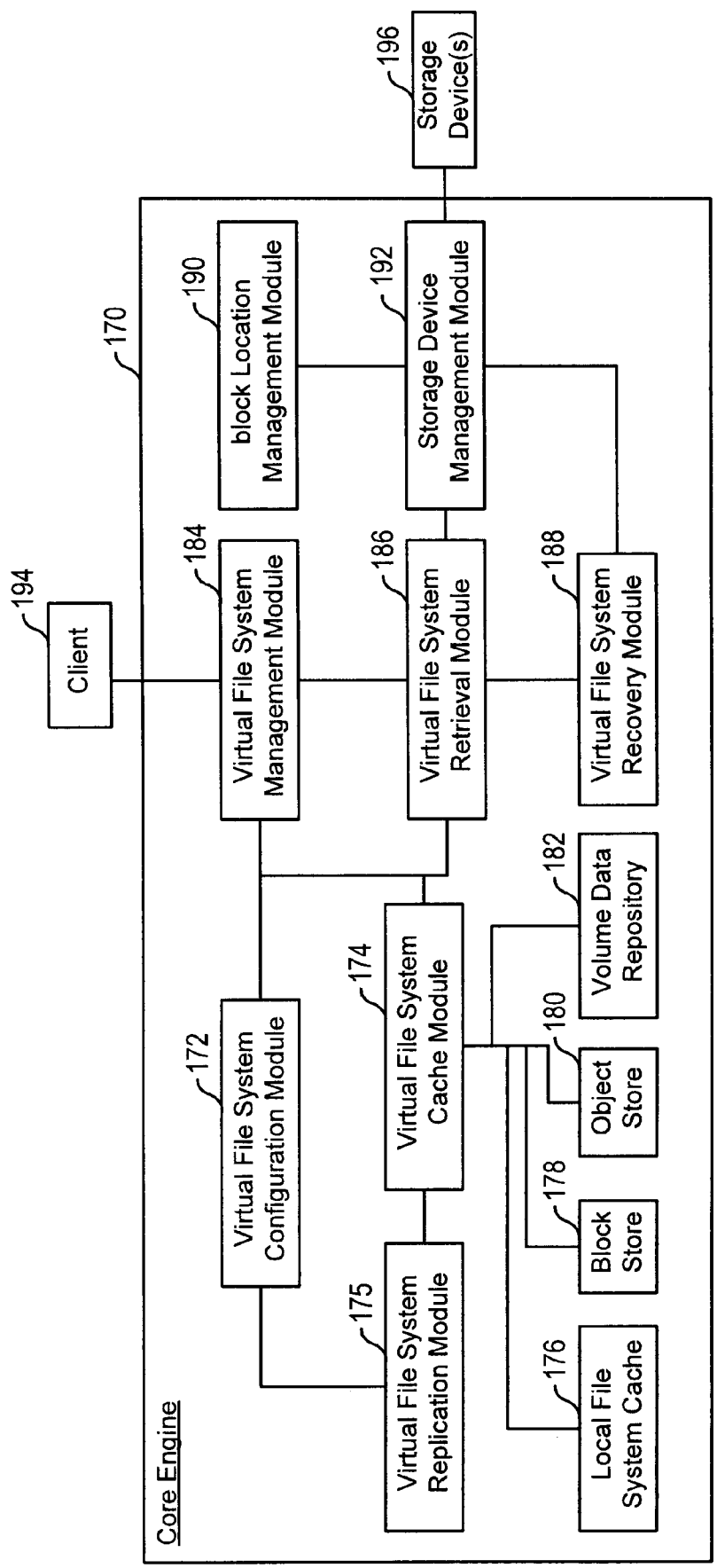
FIG. 1D is a block diagram illustrating a plurality of components of a core engine according to some embodiments.

As describe above, the core engine of the virtual file system includes multiple components for managing different aspects of the virtual file system 102. FIG. 1D is a block diagram illustrating a plurality of components of a core engine according to some embodiments.

As shown in FIG. 1D, the core engine 170 communicatively connects the client 194 to the storage devices 196. In order to explain how the core engine 170 supports different file-related requests, the core engine 170 is divided into multiple application modules, each module being responsible for performing one or more specific operations. In some embodiments, the core engine 170 includes a virtual file system (VFS) management module 184 for interfacing with the client 194, e.g., receiving client requests for downloading or uploading certain files or instructions for modifying the virtual file system's configuration (e.g., its replication policy) and sending files to the requesting user. The VFS management module 184 is communicatively connected to the VFS configuration module 172 and the VFS retrieval module 186.

The VFS configuration module 172 is responsible for configuring the virtual file system (in particular, the core engine 170) to perform operations in a user-specified manner. For example, a user may specify that certain files or types of files not be stored in any remote storage devices for security reason or that certain files or types of files be always encrypted before being pushed to a remote storage device. In some embodiments, a user may define a tier structure for the storage cloud. For example, tier one are those local storage devices, tier two refers to those remote storage devices offered a service provider with high-speed access, and tier three correspond to those remote storage devices without high-speed access. In addition, the user may further specify that files having a predefined type or size or both should be stored at a particular tier of storage devices. For example, the user may specify that video files should be stored in a local storage device as much as possible to avoid the delay when a user tries to access these video files. In some embodiments, a user may provide instructions on how to achieve data redundancy (e.g., through parity computation) to recover from potential system failure. In some embodiments, the VFS configuration module 172 receives the user preferences or requirements through the VFS management module 184 and saves them at a predefined location in the local file system (e.g., on a per-user basis) for controlling the behavior of the virtual file system.

The VFS retrieval module 186 is responsible for retrieving information associated with a file in accordance with instructions from the VFS management module 184. As will be explained below in connection with FIGS. 2A to 2F, a file is first converted into a set of blocks before being stored in any local or remote storage device according to some embodiments. Each block is a self-containing or self-describing unit to be allocated at a particular location with a storage device. The storage device is foreign to the relationship between a block it hosts and a corresponding file managed by the virtual file system. In some embodiments, the VFS retrieval module 186 identifies one or more blocks associated with a particular file and then passes information about the identified blocks to a storage device management module 192 that is responsible for fetching the corresponding blocks from the storage devices 196. In some embodiments, the storage device management module 192 includes multiple sub-modules, each sub-module configured to communicate with one or more particular storage devices for fetching/pushing blocks from/to the corresponding storage devices.

In some embodiments, the virtual file system supports one block to be shared among multiple revisions of the same file or even multiple files regardless of whether they are related or not. This feature is effectively a delta compression scheme to reduce the storage usage and improve the network usage. The core engine 170 includes a block location management module 190 for implementing this feature by generating and managing a mapping between the virtual file system and the storage devices 196. For each block to be fetched or pushed, the storage device management module 192 (or one of its sub-modules) queries the block location management module 190 for a corresponding location of the block at a particular storage device and then performs the specific operations. In some embodiments, the block location management module 190 may be part of the storage device management module 192.

To be a reliable file management system, the virtual file system has the necessary capacity of recovering the files lost due to an unexpected, but may be fatal, system failure or network breakdown. For example, in response to the instructions from the VFS retrieval module 186, the storage device management module 192 attempts to fetch a block from a specific storage device but receives an error message indicating that the requested block is no longer stored at the storage device. In this case, the VFS retrieval module may instruct the VFS recovery module 188 to recover the lost block to satisfy the client request. In some embodiments, the virtual file system implements a parity-based data recovery scheme before its pushes any block to the storage cloud. Upon receipt of the block recovery instruction, the VFS recovery module 188 checks if it has access to the blocks necessary for reconstructing the lost block according to the parity-based data recovery scheme. If there is any block not available, the VFS recovery module 188 may notify the storage device management module 192 to retrieve the block from a respective storage device. After collecting all the blocks, the VFS recovery module 188 then performs the parity-based data recovery scheme to rebuild the missing block and returns the rebuilt block to the VFS retrieval module 186 for performing the subsequent processing steps in connection with the client request.

As noted above, a file is stored at the storage devices in the form of one or more blocks. Because of the file-to-block conversion, after the virtual file system retrieves all the blocks associated with a file from the storage devices, it cannot serve the blocks to a requesting client directly. Instead, the virtual file system needs to perform a block-to-file conversion to rebuild the client requested file. Throughout this application, the file-to-block conversion may also be referred to as "block packing" or "pack a block" while the block-to-file conversion as "block unpacking" or "unpack a block."

Referring again to FIG. 1D, the VFS management module 184 or the VFS retrieval module 186 forwards the blocks retrieved from the storage devices to the VFS cache module 174. The VFS cache module 174 is responsible for unpacking these blocks and rebuilding the client requested file. In some embodiments, the retrieved blocks are initially stored at the volume data repository 182. The VFS cache module 174 unpacks the blocks into one or more data blocks containing the content of a file and one or more objects containing the metadata of the file. In some embodiments, the data blocks are stored at the block store 178 and the metadata objects are stored at the object store 180. In some embodiments, the block store 178, the object store 180, and the volume data repository 182 are merged into one data structure entity. For illustration, they are abstracted into three entities throughout the specification. Using the data blocks and the metadata objects, the VFS cache module 174 rebuilds the client-requested file and stores the file in the local file system cache 176. In addition, the VFS cache module 174 also builds a hierarchical tree structure referencing the file using the metadata objects associated with the file and updates the tree structure to keep track of all subsequent operations to the file. Throughout this application, this tree structure is sometimes referred to as "commit tree" or "commit graph."

In some embodiments, the data traffic across the core engine 170 is bi-directional. As described above, data may come from the store devices 196, pass through the core engine 170, and arrive at the client 194. This is the process of the virtual file system retrieving data from the store devices to satisfy a file request from the client 194. Conversely, data may come from the client 194, pass through the core engine 170, and reach the storage devices 196. This is the process of the virtual file system synchronizing data with the store devices. During this data synchronization process, the VFS cache module 174 is responsible for breaking a file into the data blocks in the block store 178 and metadata objects in the object store 180 and then packing them into a set of blocks stored in the volume data repository. Through the VFS retrieval module 186 and the storage device management module 192, the VFS cache module 174 pushes the blocks into the storage devices 196.

In some embodiments, a user may have chosen a data redundancy policy for the virtual file system in order to protect against potential data loss. In this case, the VFS replication module 175 receives the data redundancy policy from the VFS configuration module 172 and implements the policies on the blocks stored at the volume data repository before they are being pushed into the storage devices 196.

Although the core engine 170 is described above in connection with a file request and the processing of a corresponding file, those skilled in the art would understand that the same methodology is applicable to the virtual file system in its entirety or any portion thereof. Note that the arrangement of the components in the core engine 170 as shown in FIG. 1D is for illustrative purpose. It would be apparent to those skilled in the art that two or more modules can be merged into one module that performs the equivalent functions or one module can be divided into multiple sub-modules for performing the equivalent functions. For example, the storage device management module 192 can incorporate the block location management module 190. Moreover, the connections of the components in the core engine 170 are used for illustrating some interactions between these modules. It would be apparent to those skilled in the art that there are interactions between two modules that are not shown in FIG. 1D. For example, the VFS management module 184 may be able to access the local file system cache 176 directly in order to determine whether a client-request file is available at the local file system cache 176.

FIGS. 2A to 2F are block diagrams illustrating data structures in association with a virtual file system according to some embodiments. These data structures are used by the components within the core engine 170 to support the operations described above in connection with FIG. 1D. In particular, the data structures such as the file node 201, the directory node, 203, and the commit node 205 correspond to the respective components of the commit tree created by the core engine 170 for tracking the state of each file and directory associated with the virtual file system. An exemplary commit tree and its evolution are described below in connection with FIGS. 6A to 6D. As will be explained below in detail, the core engine 170 uses the commit tree structure to record the operations performed on the virtual file system so that it can easily locate a client-requested file or directory or a client-requested revision of a file or directory.

Figure 2A:
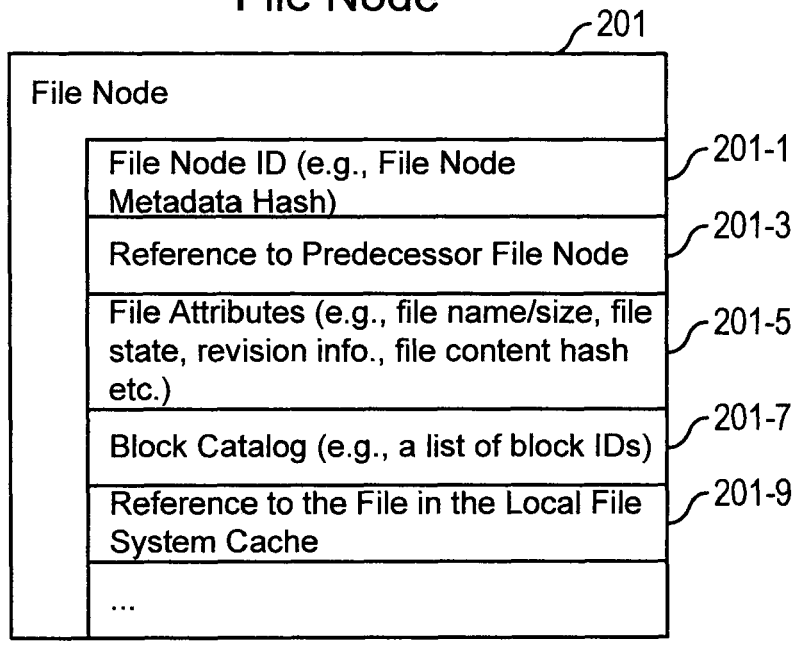
FIGS. 2A to 2F are block diagrams illustrating data structures in association with a virtual file system according to some embodiments.

FIG. 2A depicts an exemplary data structure of a file node 201, which is located at a leaf of the commit tree. The file node 201 includes a file node ID 201-1, a reference to a predecessor file node 201-3, one or more file attributes 201-5, a block catalog 201-7, and a reference to the file at the local file system cache 201-9. In some embodiments, the file node ID 201-1 is generated by applying a hash algorithm (e.g., SHA-256) to the other metadata entries in the file node 201 to ensure its uniqueness. The reference to a predecessor file node 201-3 is used for identifying a previous revision of the same file. Using this parameter, the core engine can locate a client-requested revision of a file from its current revision by traversing across the commit tree. Note that this entry is empty if the file node 201 identifies the initial version of a file. The file attributes 201-5 may include its name and size, its current state, its revision timestamp, its content hash, etc. In some embodiments, a file in the virtual file system may switch between the following states:

local—the file only exists at the local file system, not at the storage cloud;

modified—the file at the local file system has been modified, but not yet synchronized with the storage cloud; and cloud—the file at the local file system has been synchronized with the storage cloud.

In some embodiments, the block catalog includes a set of block IDs, each block ID identifying a respective content block within the storage cloud. As will be explained below, the use of block catalog to identify a file's content makes it possible for different revisions of the same file to share the same set of content blocks that have not been changed between these revisions while each revision has a respective set of content blocks that represents the changes to the content made by that revision. In some embodiments, this block sharing concept is expanded from different revisions of the same file to different files to increase the storage cloud's efficiency. In some embodiments, the reference to the file at the local file system cache 201-9 is optional. This entry may be filled if there is a local copy of the file at the local file system cache, which was generated by the virtual file system in response to either a request for retrieving the file from a remote storage device or a request for uploading the file into the virtual file system. In some embodiments, this entry is implied by the relative path of the file in the local file system cache 176.

Note that not all the attributes shown in FIG. 2A are necessary components of the file node's data structure. This observation also applies to the directory node and the commit node described below. In some embodiments, the file node ID 201-1 is not kept in the file node 201 because it can be dynamically generated from the other components of the data structure. In some embodiments, the file node may include the storage policy associated with the file. By having the storage policy, the virtual file system supports the file-level configuration of its storage strategy. This observation also applies to the directory node and the commit node described below such that the directory-level storage policy applies to all the files and child directories that do not have their respective storage policies and the commit-level storage policy applies to all the associated files and directories that do not have their own storage policy. In other words, a lower-level tree node's storage policy can overwrite a higher-level tree node's storage policy.

Figure 2B:
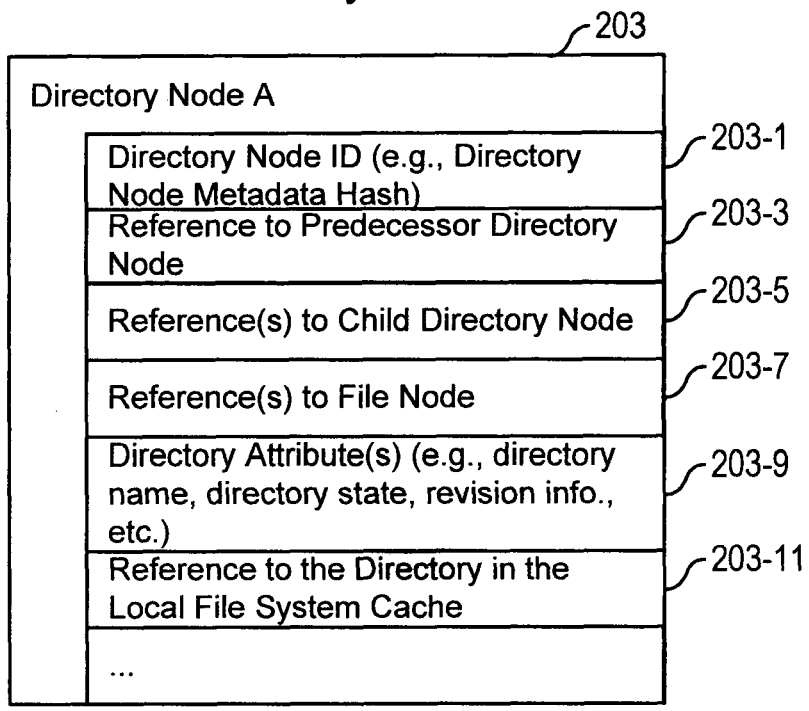

FIG. 2B depicts an exemplary data structure of a directory node 203, which is an intermediate node of the commit tree (unless it corresponds to an empty directory in the virtual file system). The directory node 203 includes a directory node ID 203-1, a reference to a predecessor directory node 203-3, a reference to a child directory node 203-5, a reference to file node 203-7, one or more directory attributes 203-9, and a reference to a directory in the local file system cache 203-11. In some embodiments, the directory node ID 203-1 is generated by applying a hash algorithm (e.g., SHA-256) to the other metadata entries in the directory node 203. The reference to a predecessor directory node 203-3 is used for identifying a previous revision of the same directory. Using this parameter, the core engine can locate a client-requested revision of a directory from its current revision by traversing across the commit tree. Note that this entry is empty if the directory node 203 corresponds to the initial version of a directory. The reference to a child directory node 203-5 is used for traversing from the current directory level to the next directory level down the hierarchical structure of the commit tree. Similarly, the reference to a file node 203-7 is used for reaching a particular file node associated with the current directory in the virtual file system. The members of the directory attributes 203-9 are similar to that of the file attributes 201-7 except that they are associated with a particular directory, not a file. In some embodiments, the reference to the directory at the local file system cache 203-11 is optional. This entry may be filled if there is a local copy of the directory at the local file system cache, which was generated by the virtual file system in response to either a request for retrieving the directory from a remote storage device or a request for uploading the directory into the virtual file system.

Figure 2C:
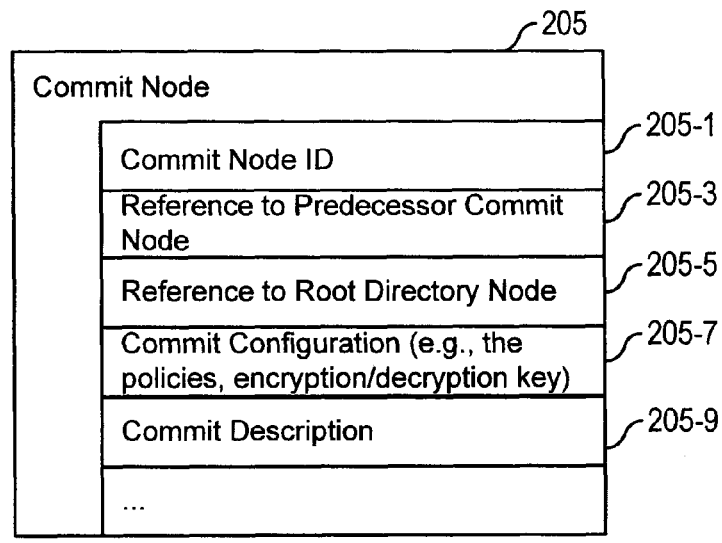

FIG. 2C depicts an exemplary data structure of a commit node 205, which is the root node of a particular branch of the commit tree. In some embodiments, each tree branch points to a particular revision of the root directory of the virtual file system. The commit node 205 includes a commit node ID 205-1, a reference to a predecessor commit node 205-3, a reference to the root directory node 205-5, one or more configuration parameters 205-7, and a commit description 205-9. In some embodiments, the commit node ID 205-1 is generated by applying a hash algorithm (e.g., SHA-256) to the other metadata entries in the commit node 205 in a predefined order. The reference to a predecessor commit node 205-3 is used for identifying a previous commit tree branch of the same virtual file system. Using this parameter, the core engine can locate a client-requested commit tree branch from the current commit tree branch by traversing across the commit tree. Note that this entry is empty if the commit node 205 corresponds to the initial commit tree branch of the virtual file system. The reference to the root directory node 205-5 is used for traversing down through the current commit tree branch. The configuration parameters 205-7 is used for specifying the commit-level data redundancy policies as well as the encryption/decryption keys used for protecting the files associated with the commit node 205. In some embodiments, the commit node 205 includes a textual description to characterize the unique aspects of the commit branch, e.g., what file/directory modifications have been applied to the files and directories associated with the commit node 205.

As noted above, the storage device management module 192, in connection with the block location management module 190, determines the identity of a storage device and a specific location at the storage device from which a block should be fetched or to which a block should be pushed. Because different types of storage devices may work differently, the core engine may have an interfacing module, which is also known as an "adapter," for a particular type of storage devices in order to store blocks in the storage devices. For example, one adapter is used for communicating with storage devices that can be attached to a computer and become part of the computer's file system, such as hard drive, thumb drive, network attached storage, etc. Another adapter is used for communicating with a cloud storage service provider by a third party such as Amazon S3. In some embodiments, an adapter is configured to perform at least three operations: (i) retrieving a metadata or content block for a given block ID within a particular data volume; (ii) storing within a storage device a metadata or content block identified by a block ID within a particular data volume; and (iii) returning a set of block IDs for a given data volume, which may include the location of each block at a respective storage device. One skilled in the art can develop an adapter for another type of storage devices or services or other operations beyond the three operations based the teachings herein.

In some embodiments, an adapter is responsible for performing a cost analysis for a particular type of storage devices based on the technical specification of the storage devices. The storage device management module 192 may compare the cost analyses provided by different adapters with the virtual file system's configuration policy to determine which type of storage services should be used for a particular storage task. The virtual file system may perform this procedure whenever a new type of storage device is attached to the virtual file system or after a predefined time period. By doing so, the virtual file system can optimize the resources offered by different storage devices and provide more efficient services to users of the virtual file system.

Figure 2D:
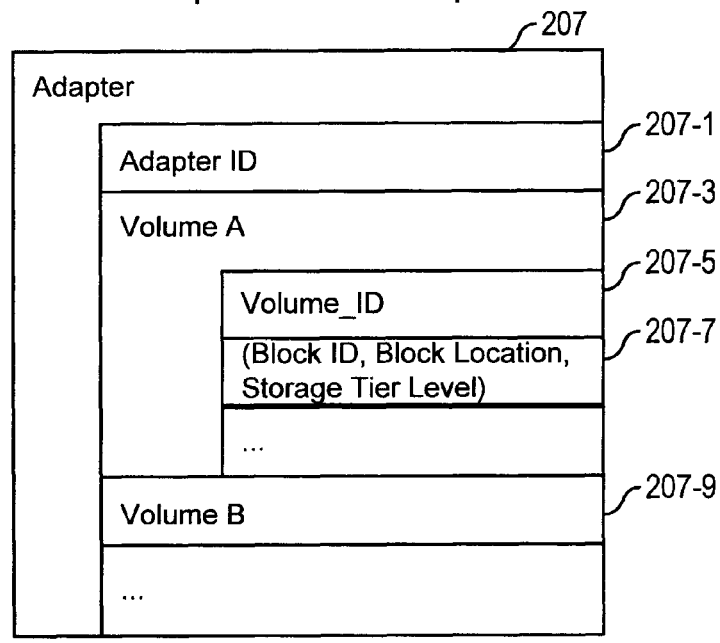

FIG. 2D depicts an exemplary adapter/block map 207, which is a data structure used by the block location management module 190 for tracking the locations of the blocks stored at the different storage devices. In some embodiments, the adapter/block map 207 is also referred to as an "object-storage mapping table." The adapter/block map 207 has a unique adapter ID 207-1. The virtual file system may have one or more data volumes (207-3, 207-9) using the same adapter associated with the adapter/block map 207. For each data volume, there is a unique volume ID 207-5 and a set of (block ID, block location, storage tier level) triplets 207-7. In some embodiments, the storage tier level indicates the cost of having a block stored in a respective storage device associated with the adapter 207. In some other embodiments, a specific cost value is provided in the adapter/block map to indicate the cost for allocating blocks at a particular storage device or devices. When the virtual file system decides to use the adapter associated with the adapter/block map 207 to store a set of blocks associated with a particular data volume at the corresponding storage devices, a new set of entries like 207-3 to 207-7 will be inserted into the adapter/block map 207. In some embodiments, the virtual file system may choose two or more adapters for storing different subsets of blocks associated with the same data volume. This may happen if the different subsets of blocks correspond to different types of files that the virtual file system has different configurations. In some embodiments, the same data volume may be stored at multiple locations based on the virtual file system's data redundancy policy. In some embodiments, the virtual file system converts the adapter/block map 207 into an object and saves the object in a block at a predefined location in a particular storage device. In some embodiments, the blocks associated with a particular adapter 207 are not organized into different data volumes. In this case, the volume ID 207-5 is not needed in the adapter/block map. By doing so, a block may be shared by multiple volumes if the block's block ID appears in multiple data volumes' metadata as described below in connection with FIG. 2F.

The data structures described above are used by the core engine for storing the metadata associated with virtual file system. Based on this metadata information, the core engine can rebuild the virtual file system at a computing device, including rebuilding different types of files within a respective data volume by retrieving the corresponding blocks from the respective storage devices. Although the files within a data volume may have different formats such as text, binary, picture, multimedia (video or audio) that may be handled by different software applications, they are treated in substantially the same way by the storage devices as a bag of blocks. But for illustrative purpose, a dichotomy of the blocks is sometimes employed when naming the blocks such that a block that stores metadata of a file (e.g., a file node) is referred to as a "metadata block" and a block that stores a portion of content of the file is sometimes referred to as a "content block" or "data block."

Figure 2E:
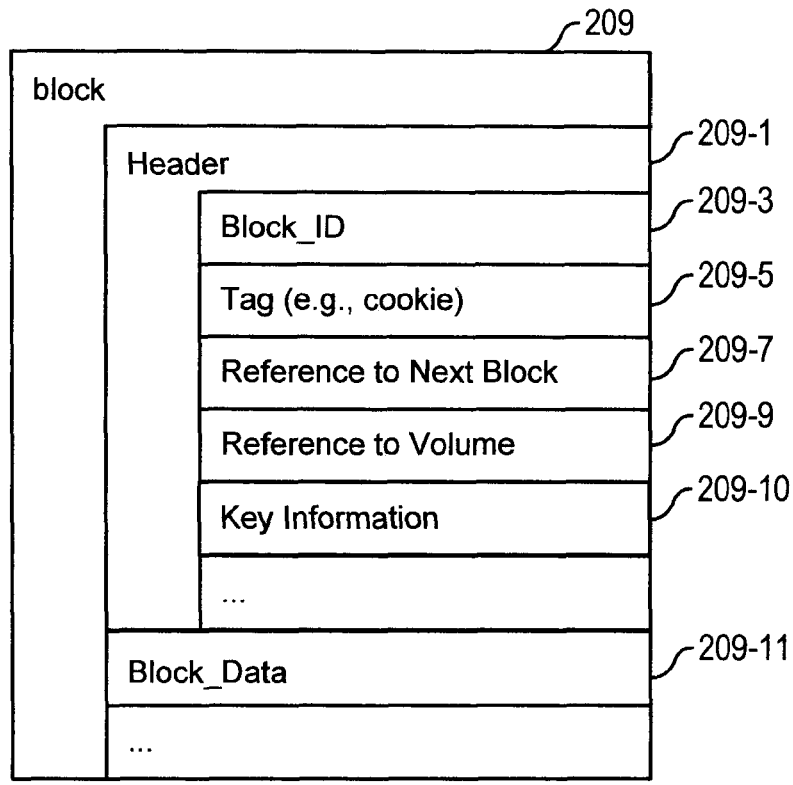

FIG. 2E depicts an exemplary data structure for a block 209. The block 209 is divided into header 209-1 and block data 209-11. Note that from a file's perspective, the block data 209-11 may be the file's metadata (i.e., the block 209 is a metadata block) or the file's content (i.e., the block 209 is a content block). The block's header 209-1 further includes a block ID 209-3, a tag 209-5, a reference 209-7 to the next block associated with the same file, a reference 209-9 to the data volume that includes the file, and key information 209-10. In some embodiments, the block ID 209-3 is generated by applying a hash algorithm (e.g., SHA-256) to the block data 209-11. The tag 209-5 is used by the core engine for determining how the block was packed and choosing a corresponding application program interface module for reading the unpacked block in connection with rebuilding the file. In some embodiments, the key information 209-10 is a hash of the block data 209-11. The core engine can compare the retrieved block data 209-11 with the key information 209-10 by recalculating the key information using the block data 209-10. A no match indicates that the block data may have been corrupted such that the core engine may need to retrieve the same block from another storage device or recover the block using other options such as parity data. In some embodiments, the block data 209-11 is encrypted using a key when the core engine packs the block. As such, the core engine needs to have the same key for decrypting the block data when unpacking the block data back to the original data block or object. By encrypting the block data before it is being stored at a storage device managed by a third party, the virtual file system can help to improve the security protection for the data from potential malicious attacks.

In some embodiments, a block stored in the storage devices does not reference other blocks or the data volume with which it is associated. The block's metadata is self-descriptive, e.g., using a content-addressable block ID to characterize what block data it has generated. The content-address block ID, as noted above, is generated by applying a hashing algorithm to the block data. The core engine generates a data volume data structure including the identifiers of the blocks associated with a particular data volume and a sequence of processing the blocks when rebuilding the files associated with the data volume.

Figure 2F:
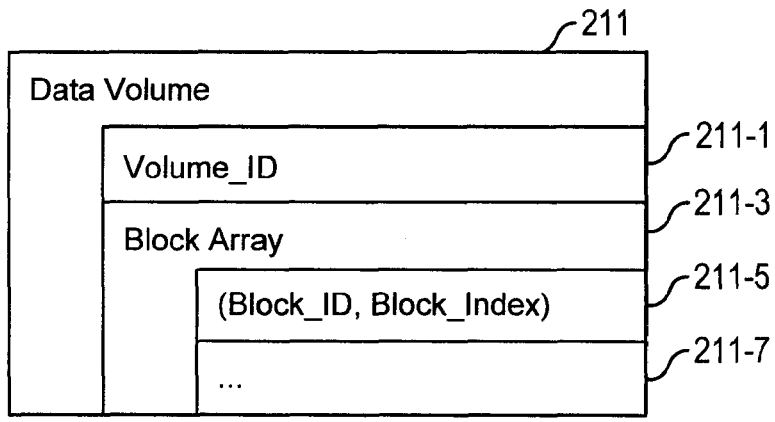

FIG. 2F depicts an exemplary data structure for a data volume 211. The data volume 211 includes a volume ID 211-1 and a block array 211-3. For each metadata or content block, there is a corresponding entry 211-5 in the block array 211-3. Each entry 211-5 in the block array 211-3 has two attributes, block ID and block index. The block ID is a content-addressable parameter that uniquely identifies a block associated with the data volume and the block index is a parameter that represents the relative position of the block with respect to the other blocks in the data volume. For example, as will be explained below, the core engine converts a node on the commit tree into an object in the object store and packs the object into a metadata block the volume data repository. The metadata block has a corresponding entry in the data volume structure 211 whose block ID is determined by the metadata associated with the node and whose block index is, by default, zero because the node has references to the other nodes in the commit tree. But an entry corresponding to a content block or data block has both the block ID that corresponds to the content of the block and a non-zero block index that represents the block's relative location, which information is used for rebuilding the file. For example, if a file has five data blocks, their respective block indexes in the data volume 211 could be 0, 1, 2, 3, and 4.

In some embodiments, the virtual file system manages multiple data volumes at the same time. For each data volume, the virtual file system may generate a data structure like the one shown in FIG. 2F. At startup, the virtual file system uses the data structures associated with different data volumes to rebuild them on a computing device. In some embodiments, the virtual file system converts the data structure for a data volume into an object and saves the object in a metadata block at a predefined location in a particular storage device. Because of the self-containing nature of the metadata and content blocks associated with a data volume, a user can rebuild the data volume at any computing device with a pre-installed virtual file system even if the virtual file system has no information about the data volume. Thus, different users can share their data volumes with each other.

The description above provides an overview of how the virtual file system (in particular, the core engine) operates in response to client instructions and multiple exemplary data structures used for supporting the operations. The description below, in connection with the figures starting with FIG. 3A and ending with FIG. 5C, focuses on how the virtual file system performs specific operations in connection with the client requests.

Figure 3A:
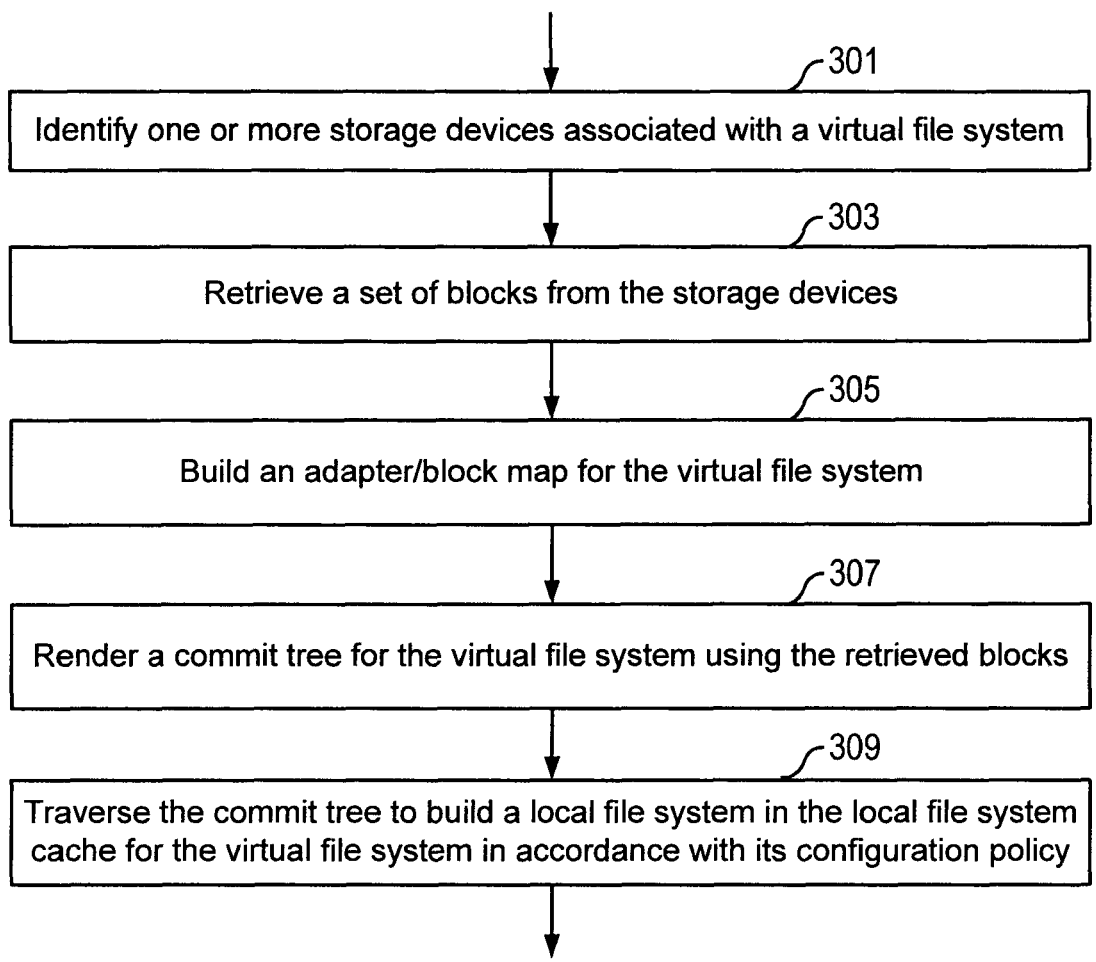
FIG. 3A is a flow chart illustrating a process of initializing a virtual file system at a computing device according to some embodiments.

FIG. 3A is a flow chart illustrating a process of initializing a virtual file system at a computing device according to some embodiments. This initialization is a precondition for the virtual file system to perform any other operations. As one of the first steps of system startup, the virtual file system identifies one or more storage devices associated with the virtual file system (301). In some embodiments, the virtual file system selects a location (e.g., a directory in the local file system) in the local hard drive as the default storage device (e.g., tier-1 storage device) for storing the blocks. Subsequently, a user of the virtual file system can add more storage devices to the virtual file system, which may be a thumb drive connected to a USB port of the computing device or a remote cloud storage service that can be accessed through the Internet. In some embodiments, each newly-added storage device is included in the configuration file of the virtual file system so that the virtual file system can reconnect to each of the storage devices at the startup.

From the associated storage devices, the virtual file system retrieves a set of blocks (303). In some embodiments, the virtual file system only retrieves a minimum number of blocks that are required to initialize the virtual file system such as the metadata blocks used for generating the commit tree, the metadata blocks associated with the adapter/block map, and the metadata and content blocks associated with the files that are required to be present at the computing device, e.g., per the virtual file system's configuration. Blocks associated with the other files can be retrieved subsequently in an on-demand fashion. In some embodiments, the virtual file system may manage multiple data volumes. Each data volume corresponds to a particular file system hierarchical structure that includes one or more directories and one or more files associated with respective directories. As described above in connection with FIGS. 2D to 2F, the virtual file system may retrieve the metadata and content blocks associated with different data volumes from the storage devices attached to the virtual file system.

Using the retrieved blocks, the virtual file system builds the adapter/block map (305). In some embodiments, the virtual file system unpacks the metadata block associated with the adapter/block map to determine the responsibilities of each adapter such as managing a set of blocks associated with a data volume, retrieving a block from a storage device or pushing a block to a storage device, and updating the adapter/block map accordingly.

Using the retrieved blocks, the virtual file system renders a commit tree for the virtual file system (307). To do so, the virtual file system identifies all the metadata blocks associated with the commit tree, extracts the metadata associated with the file/directory/commit nodes from the blocks, and builds a hierarchical tree structure that links the tree nodes with a respective file/directory/commit node. In some embodiments, the virtual file system assembles the commit tree in a top-down fashion, starting with the commit nodes and ending with every file node or directory node. At the end of the process, the virtual file system chooses one of the commit nodes (if there are multiple commits associated with the virtual file system) as the current commit by having a head node pointing to the current commit node. As will be explained below, the commit tree is similar to a snapshot of the virtual file system at a particular moment, which tracks every update to the virtual file system. The commit tree rendered at the system startup not only has the current status of the virtual file system (e.g., the revision timestamps of every file and directory associated with the virtual file system and their associated content) but also provides a mechanism for a user to arbitrarily revert to a previous revision for the same file or directory. This mechanism is built into the commit tree because each tree node data structure (file node 201, directory node 203, or commit node 205) has a reference to its predecessor tree node.

For example, assume that a virtual file system's commit tree has three branches, each branch beginning with a respective commit node (C1, C2, C3) and ending with a respective file node (F1, F2, F3), and that each of the three tree branches is added to the commit tree when there is an update to a file associated with the three file nodes. In other words, the three tree branches represent three revisions to the file. As noted above, the file node data structure 201 includes a reference 201-3 to its predecessor file node such that F3 references F2 and F2 references F1. Therefore, a user who reaches the file node F3 by traversing down the tree branch containing F3 can revert to any of the two previous revisions to the file by traversing laterally from the file node F3 to the file node F2 and then the file node F1. As depicted in FIGS. 2B and 2C, this mechanism is applicable to the lateral traversal of directory (or commit) nodes. A more detailed example is provided below in connection with FIGS. 6A to 6D.

As noted above, one virtual file system may manage multiple data volumes at the same time. In some embodiments, the virtual file system builds one commit tree for each data volume such that different data volumes have different commit trees. In some other embodiments, the virtual file system builds one commit tree for all the data volumes. Other than this difference, the two approaches share substantially the same underlying mechanism. For simplicity, the description below assumes that there is one commit tree for the virtual file system unless otherwise specified.

Next, the virtual file system traverses the commit tree to build a local file system in the local file system cache in accordance with the virtual file system's configuration (309). In some embodiments, the virtual file system (or the core engine, to be specific) first retrieves blocks associated with those files that are required to be found in the local file system and then unpacks them to rebuild each file in the local file system cache. Note that the file rebuilding process may fail if the virtual file system is unable to retrieve at least one of the blocks necessary for the file rebuilding. As will be explained below in connection with FIG. 4A, the virtual file system sometimes may have to leverage on the data redundancy scheme built into the data volume to recalculate the missing blocks if necessary.

Figure 3B:
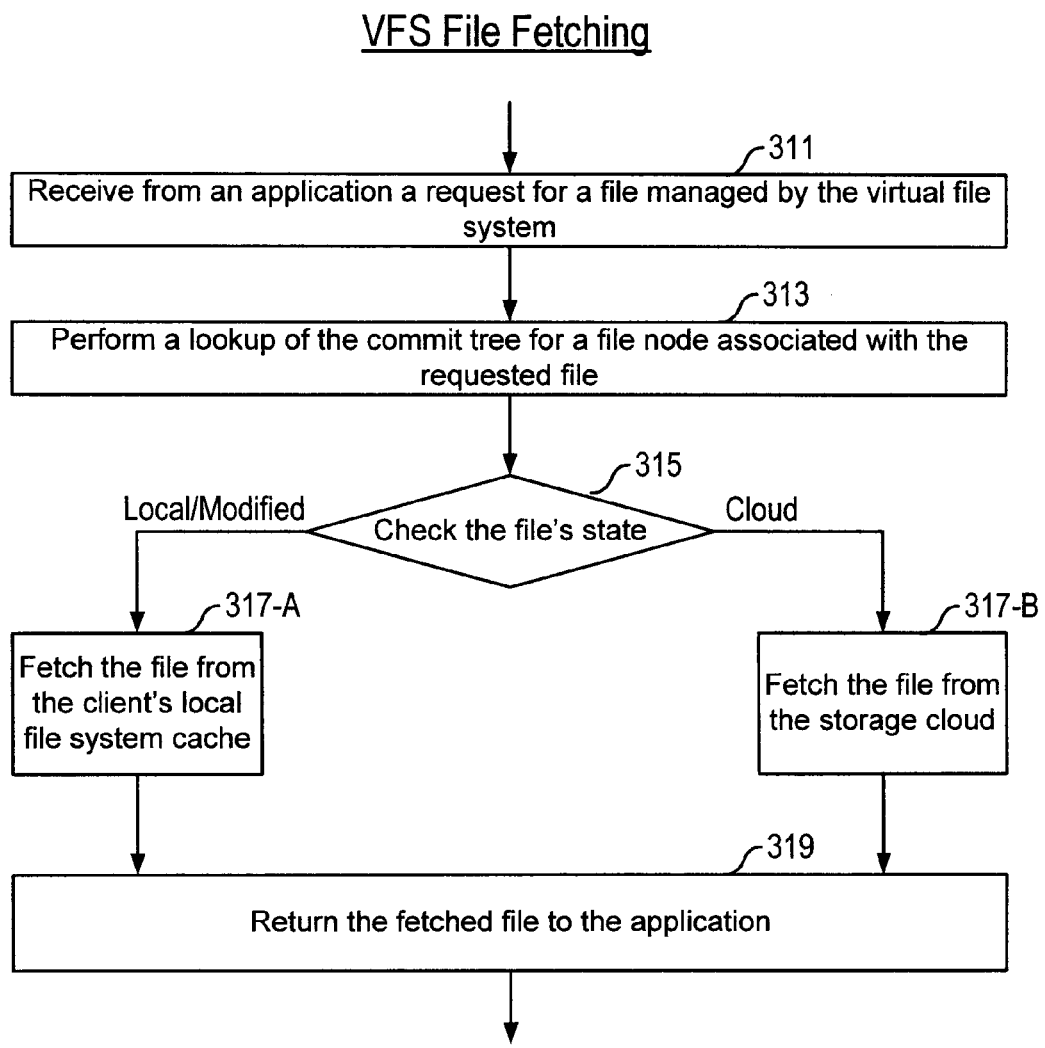
FIG. 3B is a flow chart illustrating a process of a virtual file system returning a file in response to a file request from an application at a computing device according to some embodiments.

One function of the virtual file system is to provide a user-requested file in response to a user request. FIG. 3B is a flow chart illustrating a process of a virtual file system returning a file in response to a file request from a user (e.g., an application) at a computing device according to some embodiments. Note that the process described herein applies to a user request for a directory of the virtual file system.

In response to a request from an application or a person for a file managed by the virtual file system (311), the core engine performs a lookup of the commit tree for a file node associated with the requested file (313). In some embodiments, the request may specify a particular revision or multiple revisions to the file for retrieval, which may or may not include the latest revision of the file. By default, the request is for the latest revision of the file. In some embodiments, the request is a user click on an icon that has an associated file node ID.

After receiving the request, the core engine identifies the file node ID and then checks the state of the file node using the identified file node ID (315).

If the file's state is one of the following two states: local or modified, there is a valid, local copy of the requested file at the local file system cache. In some embodiments, the state "modified" may include the addition of a new file to the virtual file system. The virtual file system identifies the location of the requested file in the local file system cache by querying the file node and then fetches the file from the local file system cache (317-A). In some embodiments, the virtual file system accesses the file using a relative path associated with the file in the local file system cache. Otherwise, the virtual file system initiates an operation to fetch the file from a storage device within the storage cloud (317-B). A detailed description of the operation is provided below in connection with FIG. 3C. In either case, the virtual file system returns the requested file to the requesting application or user (319).

Figure 3C:
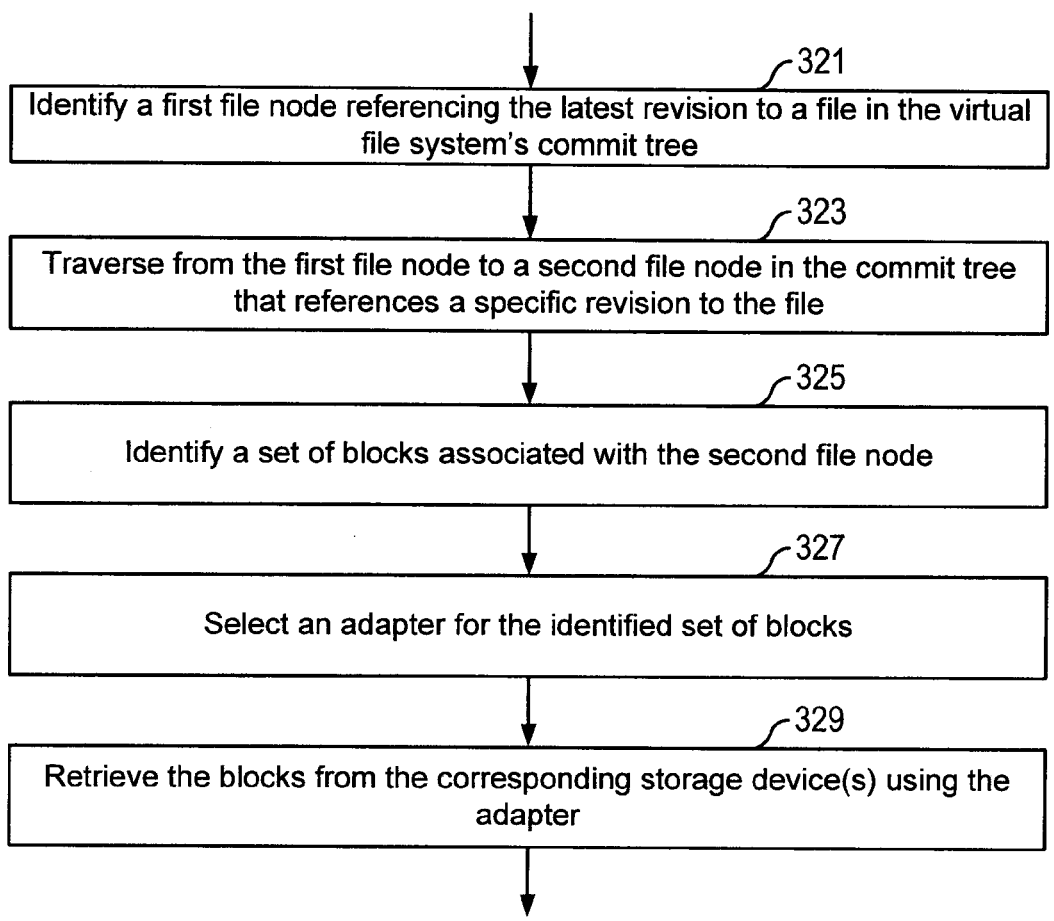
FIG. 3C is a flow chart illustrating a process of a virtual file system retrieving a set of data blocks associated with a file from a storage device according to some embodiments.

FIG. 3C is a flow chart illustrating a process of a virtual file system retrieving a set of data blocks associated with a file from a storage device according to some embodiments. As noted above, there is an inter-node referencing mechanism that links the file/directory/commit nodes together into a commit tree like the one shown in FIG. 6D. Among the three types of node, the commit node is at the root of the commit tree, pointing to the root directory node, and each file node corresponds to a leaf node of the commit tree while all the directory nodes are located in-between the commit node and the file nodes (note that an empty directory node may correspond to a leaf node). A commit tree may have multiple tree branches, each branch corresponding to a respective revision of a file in the virtual file system.

The core engine identifies a first file node referencing the latest revision of the file in the commit tree (321). Note that the first file node may or may not be part of the last commit tree branch depending on what causes the commit of the latest tree branch. From the first file node, the core engine traverses laterally to a second file node in the commit tree (but part of a different tree branch) that references a specific revision of the file (323). Assuming that the specific revision is the client-requested one, the core engine extracts the block catalog from the second file node and identifies a set of blocks associated with the second file node (325). As explained above, an adapter is then selected (327) for retrieving the blocks from the corresponding storage devices (329). In some embodiments, the core engine may choose multiple adapters for retrieving the blocks from the corresponding storage devices by assigning a subset of the blocks to a respective adapter in a predefined manner (e.g., randomly) so as to balance the load at different storage devices and improve the virtual file system's efficiency.

In some embodiments, a specific revision of a file may be retrieved by synchronizing the commit tree of the virtual file system to a particular revision of the commit tree revision that includes the specific revision of the file. Because the entire commit tree has been synchronized, the file of choice is also automatically synchronized to the user-desired revision.

Figure 3D:
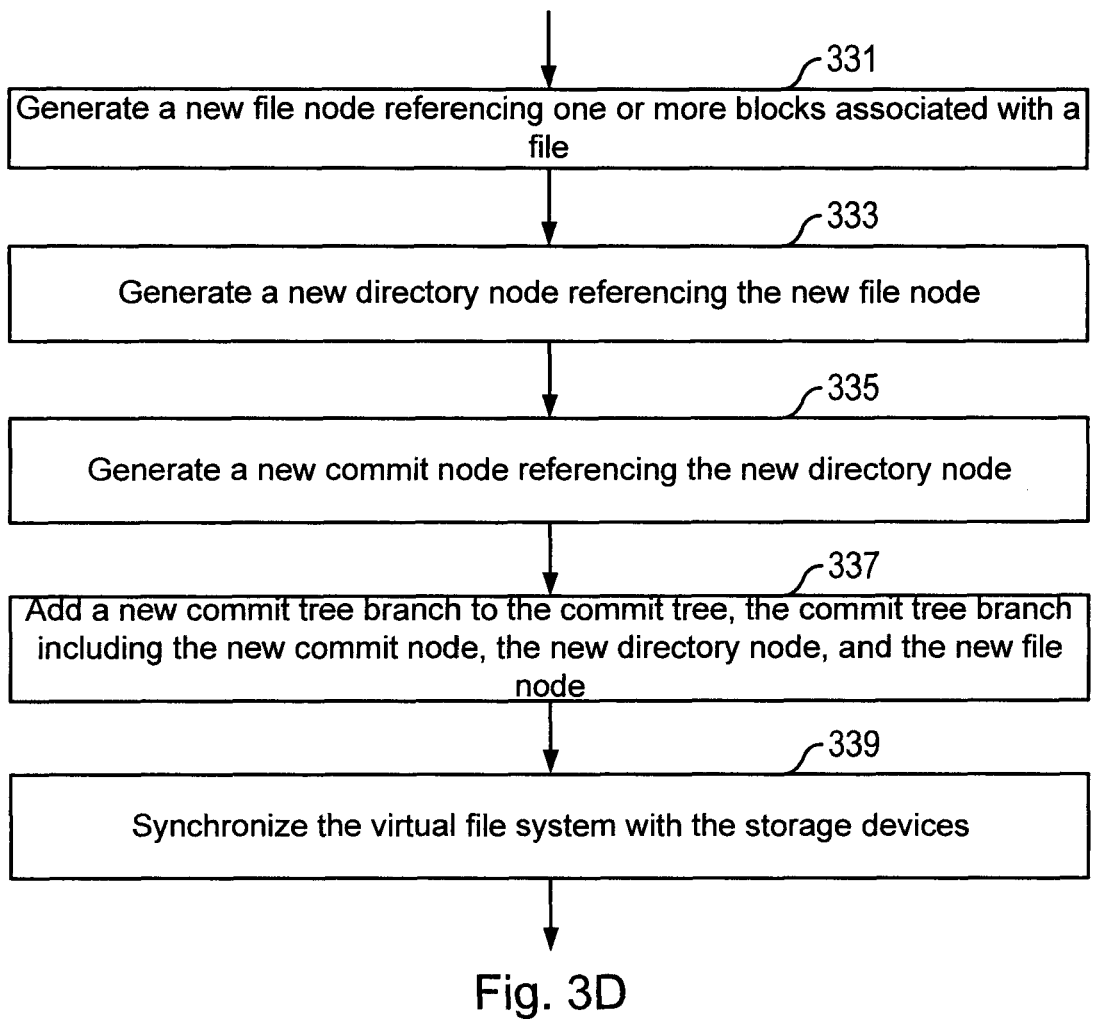
FIG. 3D is a flow chart illustrating a process of a virtual file system generating metadata for a new revision of a file and synchronizing the new revision with a storage device according to some embodiments.

FIG. 3D is a flow chart illustrating a process of a virtual file system generating metadata for a new revision of a file and synchronizing the new revision with a storage device according to some embodiments. In some embodiments, this process may be triggered in response to a client request to add a new file to the virtual file system or update an existing file in the virtual file system. As noted above, the virtual file system typically adds a new branch to the commit tree to log the transactions happening to the virtual file system between the last commit and the current commit. In some embodiments, the core engine generates the new tree branch in a bottom-up fashion. For example, the core engine first generates a new file node referencing one or more blocks associated with the new/updated file (331). Next, the core engine generates a new directory node referencing the new file node (333) and generates a new commit node referencing the new directory node (335). In some embodiments, the core engine may iterate the two steps multiple times if there are multiple directory layers separating the file node from the commit node. The generation of the new commit node implies the creation of the new commit tree branch. The core engine then adds the new commit tree branch to the commit tree (337). Finally, the core engine synchronizes the virtual file system with the storage devices by pushing the new blocks associated with the file node to the respective storage devices (339).

Figure 3E:
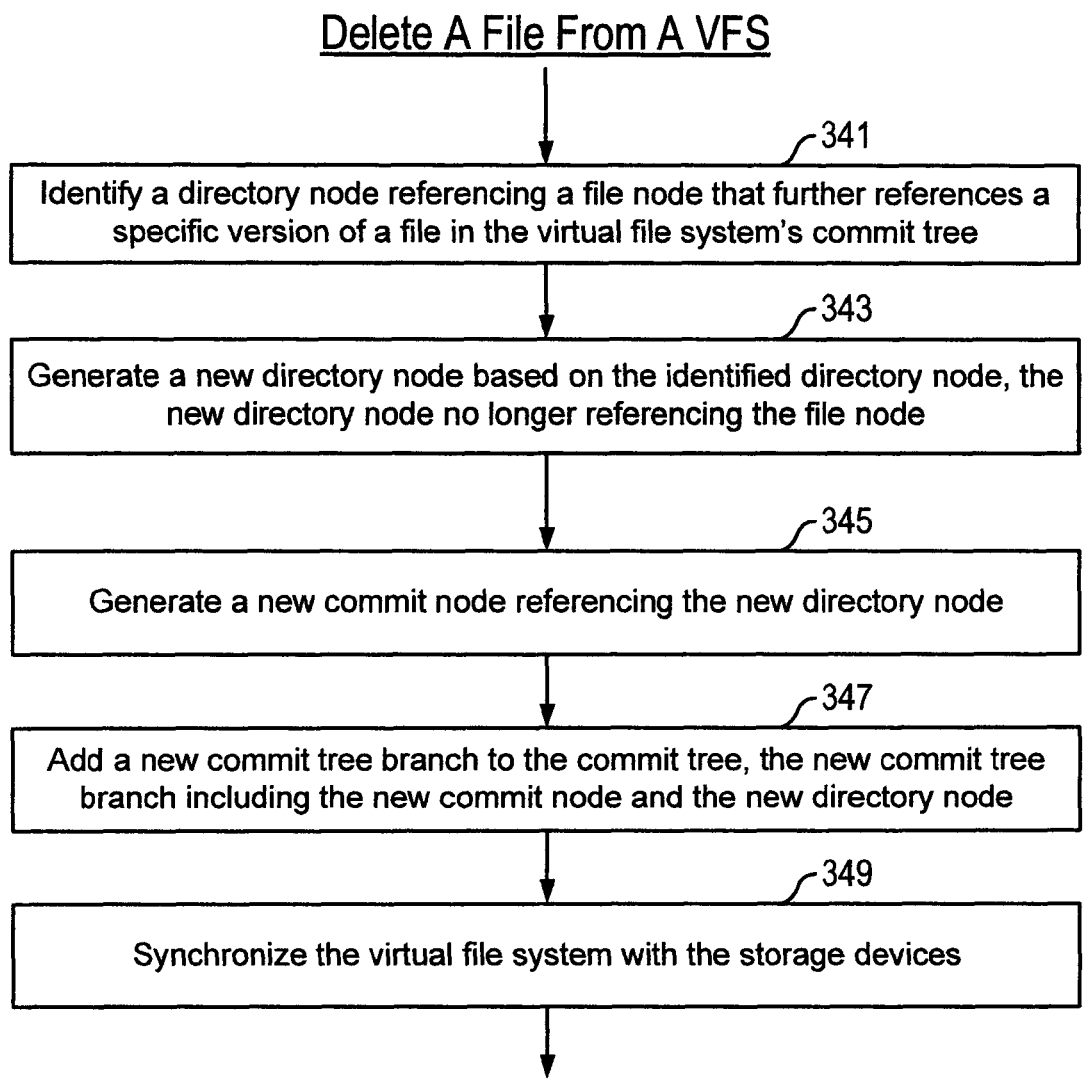
FIG. 3E is a flow chart illustrating a process of a virtual file system generating metadata for a deletion of a file and synchronizing the deletion with a storage device according to some embodiments.

FIG. 3E is a flow chart illustrating a process of a virtual file system generating metadata for a deletion of a file and synchronizing the deletion with a storage device according to some embodiments. In some embodiments, the deletion of a particular revision of a file is treated like updating an existing file by adding a new tree branch to the commit tree. For example, the core engine identifies a directory node referencing a file node that references a specific revision of a file in the virtual file system (341). Next, the core engine generates a new directory node based on the identified directory node such that the new directory node no longer references the file node associated with the file revision of be deleted (343). The core engine then generates a new commit node referencing the new directory node (345). In some embodiments, the core engine may iterate the two steps multiple times if there are multiple directory layers separating the file node from the commit node. The generation of the new commit node implies the creation of the new commit tree branch. The core engine then adds the new commit tree branch to the commit tree (347). Finally, the core engine synchronizes the virtual file system with the storage devices by pushing the new blocks associated with the file node to the respective storage devices (349).

Figure 4A:
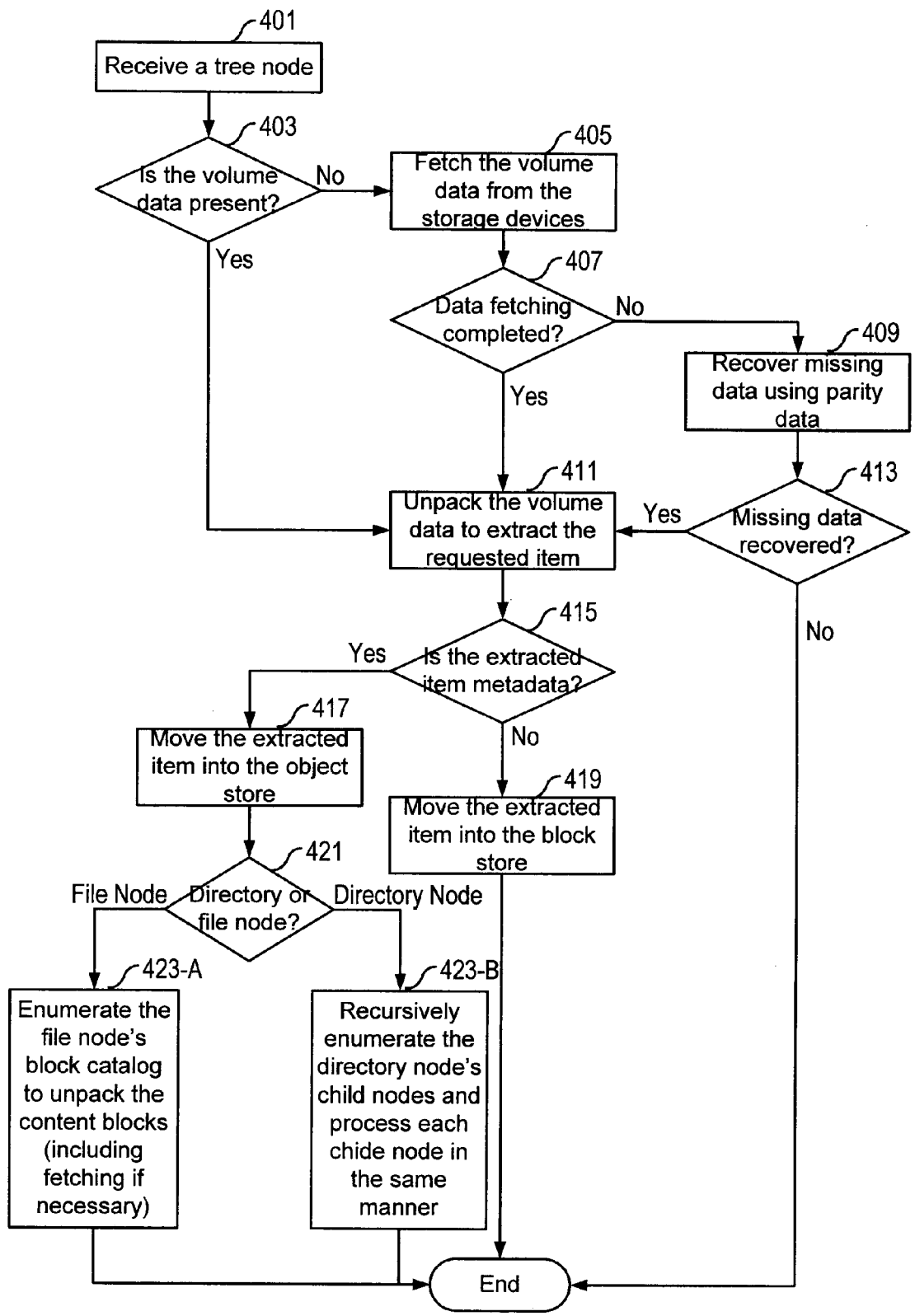
FIG. 4A is a flow chart illustrating a process of a virtual file system processing metadata blocks and content blocks retrieved from a storage device according to some embodiments.

FIG. 4A is a flow chart illustrating a process of a virtual file system processing metadata blocks and content blocks retrieved from a storage device according to some embodiments. As described above in connection with FIG. 3C (e.g., step 329), the core engine turns a request for a file or even a data volume into requests for a set of metadata and content blocks and then fetches each block from a respective hosting storage device using an appropriate adapter. The process depicted in FIG. 4A provides more details of how the core engine processes each tree node in connection with retrieving a client-requested file.

Assuming that the core engine reaches a tree node in a commit tree branch (401), the core engine first checks whether the corresponding volume data is present in the volume data repository or not (403). If not (403-No), the core engine identifies the tree node ID of the tree node and optionally a block catalog (if the tree node is a file node) and then fetches the corresponding metadata blocks and content blocks from the respective storage devices (405). At a predefined moment (e.g., after fetching one block), the core engine checks if all the blocks have been fetched or not (407). In some embodiments, there are multiple copies of a block at different storage devices, each copy having a respective priority defined by the core engine. The core engine starts with an adapter for retrieving a block from a respective storage device with the highest priority. If this attempt fails, the core engine may choose another adapter for retrieving a block from a respective storage device with the next highest priority. In some embodiments, if the core engine determines that it cannot finish the block fetching after a predefine time period (407-No), the core engine may need to recover the missing data using either the parity data or a data at a mirroring site (409). A more detailed description of the missing data recovery process is provided below in connection with FIG. 4B.

If the block fetching is completed (407-Yes) or if all the blocks are already present (403-Yes), the core engine then unpacks the volume data (e.g., the metadata and content blocks) to extract one or more data items from each block (411). In some embodiments, a data item within a metadata block could be a file node object, a directory node object, or a commit node object and a data item within a content block is a file's entire or partial content. As described above in connection with FIG. 2E, each block has an associated tag for unpacking the block. In some embodiments, the data within a block has been serialized when the block was generated. The unpacking of the block is a process that deserializes the block so that the core engine can access each entry within a particular data structure as shown in FIGS. 2A to 2C.

For each extracted item, the core engine checks whether it is metadata or file content (415). If the data item is part of a file's content (415-No), the core engine puts the item into the block store (419), which will be combined with the other contents of the same file to form a copy of the file in the local file system cache. Otherwise (415-Yes), the extracted item is an object corresponding to one of a file node, a directory node, or a commit node, which is moved by the core engine into the object store (417). The core engine then determines whether the object is a directory node object or a file node object (421). If the object corresponds to a directory node, the core engine recursively enumerates the directory node's child nodes and processes each child node (423-B), which may be another directory node or a file node. Note that the enumeration of the child nodes is basically a repetition of the process against each child node as described above in connection with steps 401 to 421. If the object corresponds to a file node, the core engine then extracts the block IDs from the file nodes' block catalog and processes each block ID in a substantially similar manner (423-A), e.g., checking if the content block is present in the volume data repository, fetching the block from a storage device, unpacking the content block.

Figure 4B:
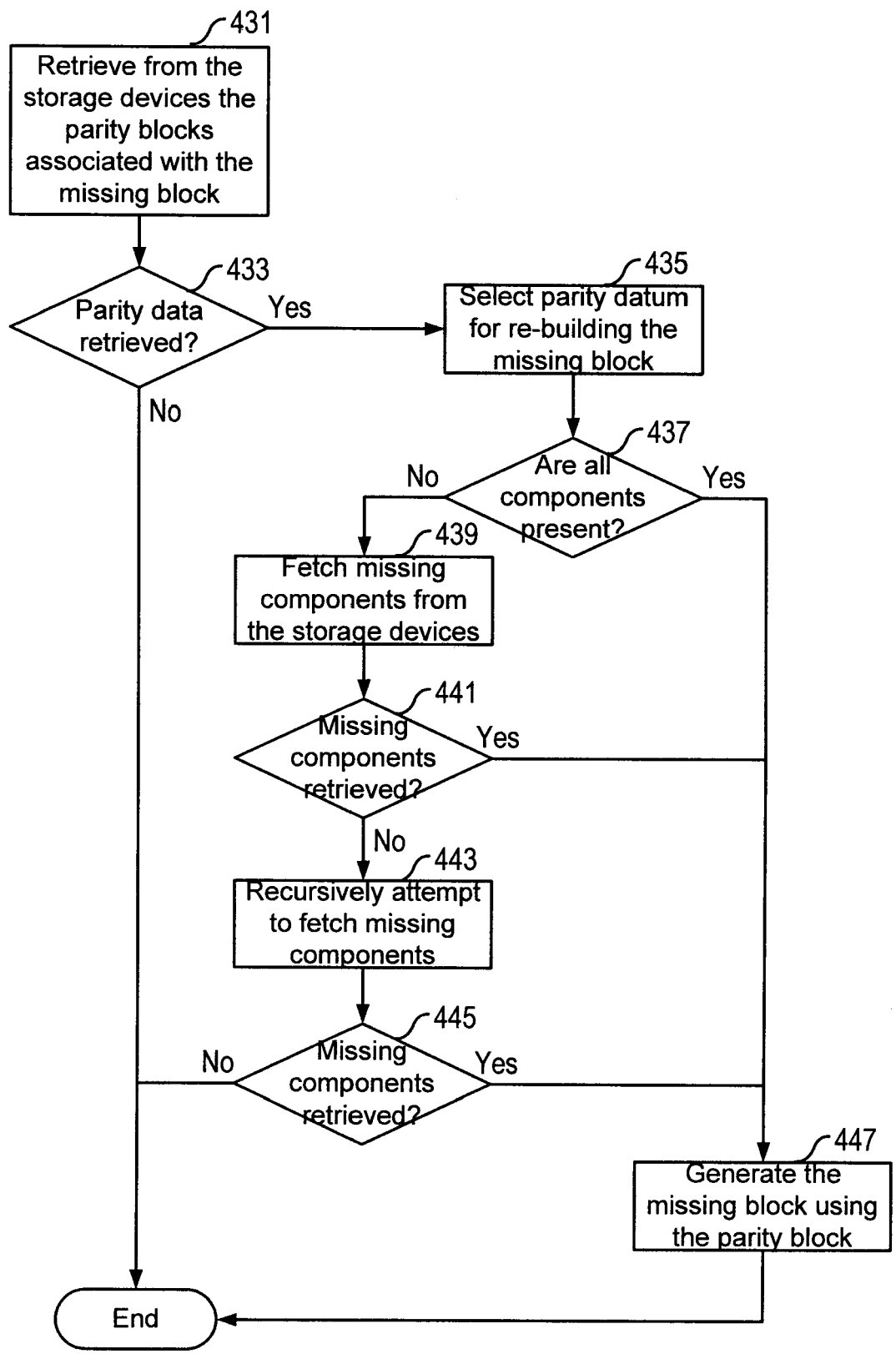
FIG. 4B is a flow chart illustrating a process of a virtual file system computing missing metadata or content using parity data retrieved from a storage device according to some embodiments.

As describe above in connection with FIG. 4A, when the core engine is unable to fetch a block in connection with a client request, it will have to recover the missing block using other information under its control. In some embodiments, the core engine recovers the missing data using pre-computed parity data. FIG. 4B is a flow chart illustrating a process of a virtual file system computing missing metadata or content using the pre-computed parity data retrieved from a storage device according to some embodiments. A more detailed description of the parity data are computed is provided below in connection with FIG. 5C.

To recover the missing data, the core engine retrieves the parity blocks associated with the missing blocks from the storage devices (431). If the core engine is unable to retrieve the parity blocks (433-No), the attempt to recover the missing blocks fails and the core engine notifies the client that it is unable to provide the requested file. Otherwise (433-Yes), the core engine selects the parity datum to rebuild the missing blocks (435). In some embodiments, a file node's block catalog not only has the block IDs of the content blocks of a file but also stores the block IDs of the parity blocks of the same file. In some embodiments, there is a parity data volume at one or more storages for storing parity data associated with the virtual file system. As will be explained below in connection with FIG. 5C, each parity block is generated by processing the other file-related blocks that may be part of the same file or from other files. Given the block ID of a missing block, the core engine checks whether it has all the components necessary for rebuilding the missing block (437). If not (437-No), the core engine may identify the missing component (i.e., another block) and fetch the missing component from the storage devices (439). If all the missing components are retrieved (441-Yes), the core engine can compute the original missing block using the parity blocks (447). If at least one of the missing blocks is not retrieved (441-No), the core engine may recursively fetch the missing components (443) until either all the components required for generating a missing block are found (445-Yes) or the core engine stops the recursive process due to its failure to fetch at least one missing component (445-No) or other possible reasons (e.g., the client request for the file has not been satisfied for more than a predefined time period).

As noted above, the virtual file system synchronizes with the storage devices in the storage cloud either periodically or in an on-demand fashion. By doing so, the virtual file system not only provides better protection for the files stored therein but also expands its management capacity beyond the capacity of the computing device on which the virtual file system runs. In addition, this procedure ensures that the same user or another user may be able to access the file updated at the computing device.

Figure 5A:
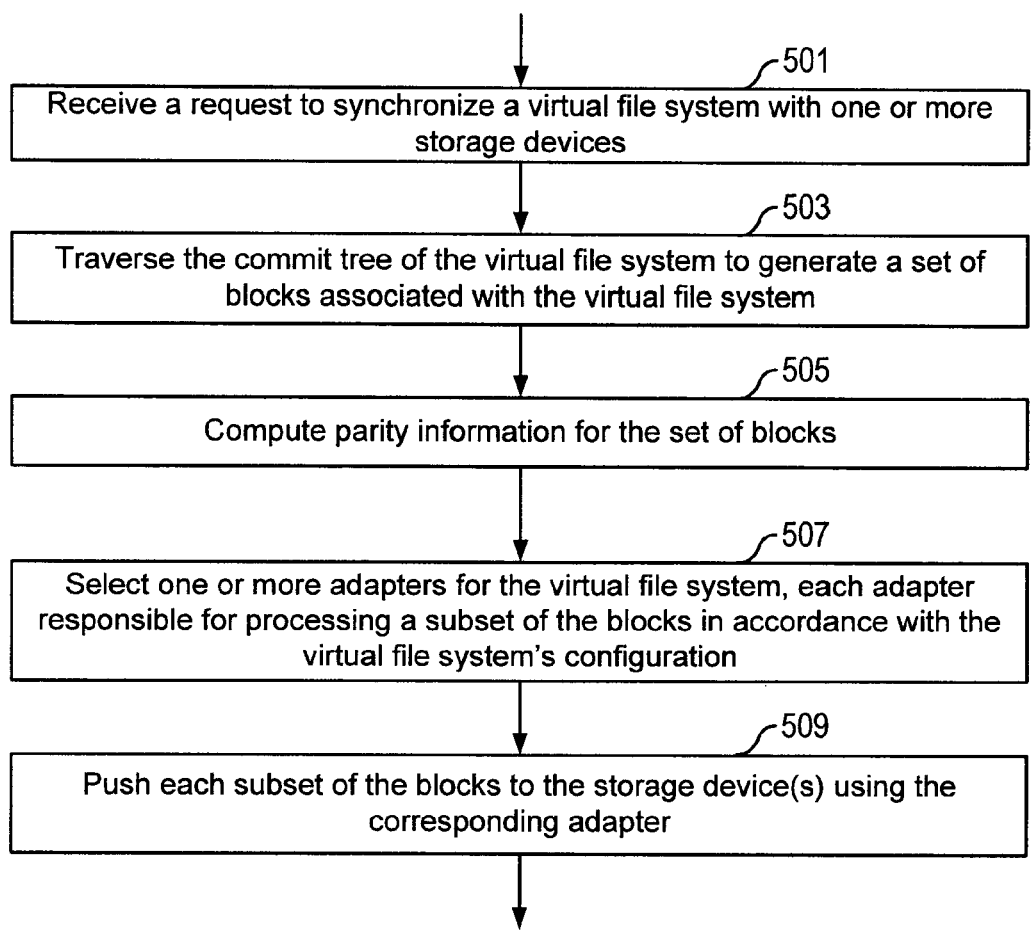
FIG. 5A is a flow chart illustrating a process of a virtual file system synchronizing metadata and data with a storage device according to some embodiments.

FIG. 5A is a flow chart illustrating a process of a virtual file system synchronizing metadata and data with a storage device according to some embodiments. Upon receiving a request to synchronize the virtual file system with one or more storage devices (501), the core engine traverses the commit tree to generate set of blocks associated with the virtual file system (503). In some embodiments, this traversal process happens at the data volume level such that there is a set of blocks associated with each individual data volume. Before pushing the blocks to the storage devices, the core engine may compute parity data for the blocks to ensure that some missing blocks may be recovered using the parity data (505). In some embodiments, the core engine may also encrypt the blocks to prevent authorized access if the blocks are stored in a cloud storage service provided by a third party. In some embodiments, based on the virtual file system's configuration policy, the core engine selects one or more adapters for the set of blocks to be pushed over to the storage cloud (507). As noted above, an adapter is usually responsible for dealing with a specific type of storage devices. Multiple adapters may be necessary if the set of blocks should be partitioned into multiple subsets and stored at different storage devices. Finally, the core engine pushes each subset of the blocks to a corresponding storage device or devices using the chosen adapter (509).

Figure 5B:
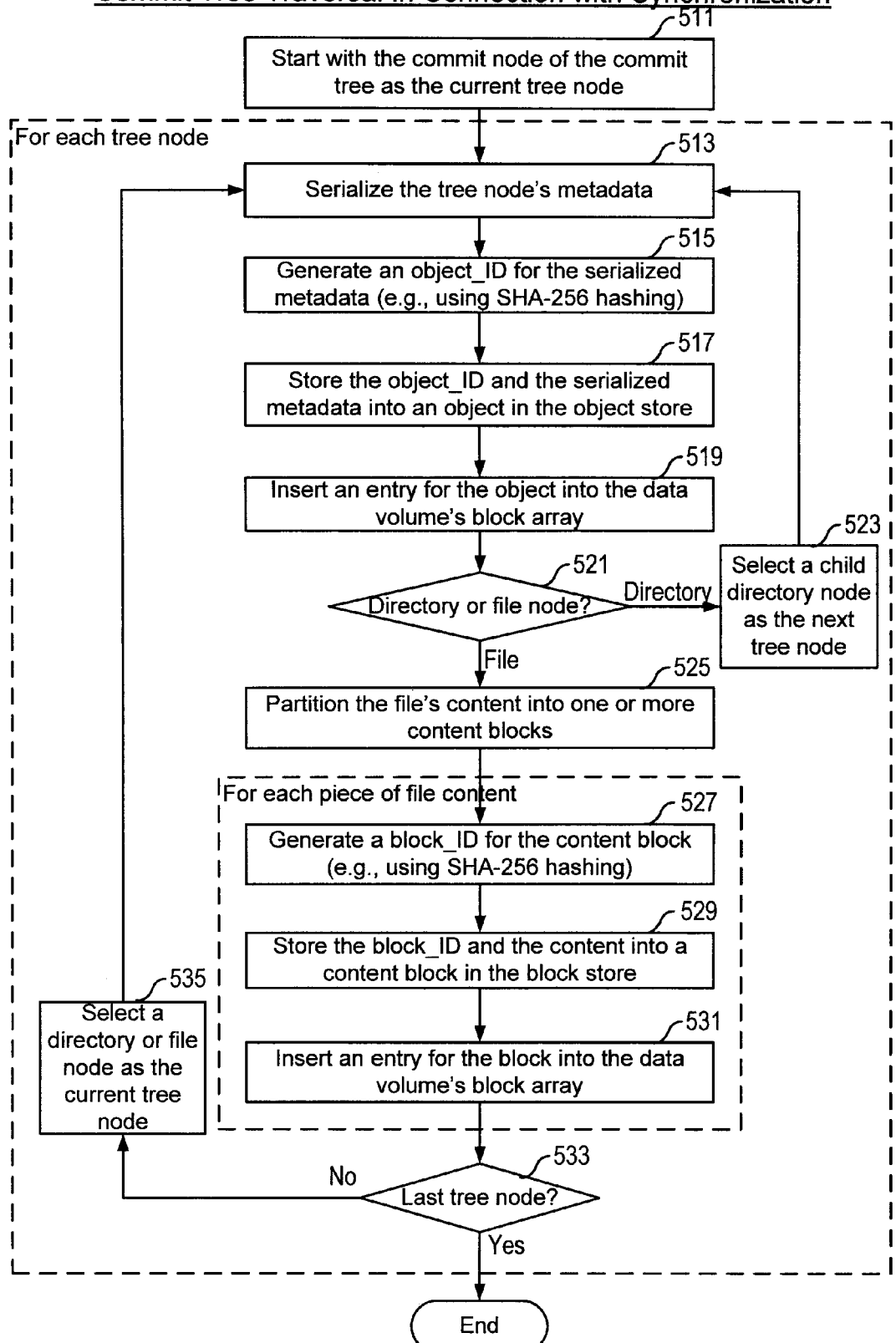
FIG. 5B is a flow chart illustrating a process of a virtual file system serializing metadata and data to be synchronized with a storage device according to some embodiments.

In sum, the synchronization of a virtual file system with the storage cloud is a process of converting the virtual file system into a plurality of metadata or content blocks and pushing each block into a respective storage device. In some embodiments, the conversion is to serialize each tree node into an object in the object store and a piece of file content into a content block in the block store. FIG. 5B is a flow chart illustrating a process of a virtual file system serializing metadata and data to be synchronized with a storage device according to some embodiments.

Unlike the process of updating the commit tree in connection with the addition or modification to the virtual file system, which is performed in a bottom-up fashion, the synchronization of the virtual file system proceeds in a top-down manner that starts with the commit node of the commit tree as the first tree node (511).

For each tree node, the core engine serializes the tree node's metadata into an object in a predefined order so that, when the core engine unpacks the object, it understands what metadata corresponds to what bytes of the object (513). Next, the core engine generates an object ID for the serialized metadata using, e.g., SHA-256 (515). In some embodiments, the object ID is a content-based address so that one content block may be shared by multiple files. The core engine stores the object ID and the serialized data into an object in the object store (517) and inserts an entry for the object into the data volume's associated block array (519).

The core engine then checks whether the tree node being processed is a directory node or file node (521). If it is a directory node, the core engine selects one of the child directory nodes (523) as the current tree node and returns to process the child directory starting from step 513. If it is a file node, the core engine then partitions the file's content into one or more content blocks (525). In some embodiments, the block size may be determined by a policy in the virtual file system's configuration such that different files have different block sizes. For example, for immutable contents such as video or picture, the policy may specify the entire file as one block; and for those mutable contents such as a MS-Word document, the policy may specify a smaller block size to make the delta compression more efficient.

For each piece of file content, the core engine generates a block ID using, e.g., the SHA-256 (527), stores the block ID and the content into a content block in the block store (529), and inserts an entry for the content block into the data volume's block array (531). As noted above in connection with FIG. 2F, an entry in the block array for a content block includes a block ID and a block index. The block index identifies the content's relative position in the file.

Finally, the core engine determines whether it has processed the last tree node (533). If not (533-No), the core engine then selects next directory or file node as the current tree node (535) and returns to process the child directory starting from step 513. Otherwise (533-Yes), the core engine has synchronized the entire virtual file system represented by the commit tree.

As noted above, data redundancy is used for protecting the virtual file system from potential data unavailability at a particular storage device. In some embodiments, the data redundancy is implemented at a block level. One scheme is to duplicate a block and store the duplicated block at a particular storage device. In some embodiments, this scheme may be more appropriate for metadata blocks. Another scheme is to compute parity data blocks from the existing blocks and stored the parity data blocks at a particular store device. This scheme is often used for content blocks. Two particular embodiments of the second scheme are disclosed below in connection with FIGS. 5C and 5D.

Figure 5C:
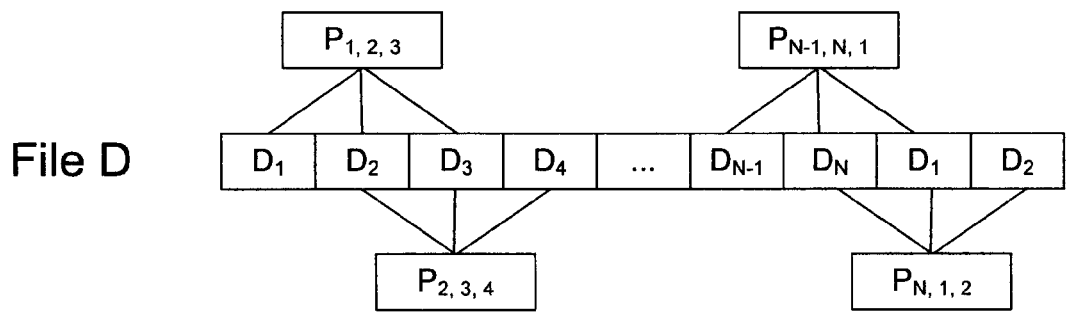
FIG. 5C is a block diagram illustrating an intra-file parity computation scheme according to some embodiments.

FIG. 5C is a block diagram illustrating an intra-file parity computation scheme according to some embodiments. For example, a file D is partitioned into content blocks $D_1$, $D_2, \ldots, D_N$. According to this scheme, the parity blocks are computed from a group of neighboring content blocks associated with the same file (for this purpose, the last block $D_N$ is deemed to be next to the first block $D_1$ to form a loop), e.g., $$P_{1,2,3} = D_1 \oplus D_2 \oplus D_3$$

$$P_{2,3,4} = D_2 \oplus D_3 \oplus D_4$$

$$\ldots$$

$$P_{N-1,N,1} = D_{N-1} \oplus D_N \oplus D_1$$

$$P_{N,1,2} = D_N \oplus D_1 \oplus D_2$$

Note that the content block $D_1$ contributes to the computation of three parity blocks, $P_{1,2,3}$, $P_{N-1,N,1}$, and $P_{N,1,2}$. Therefore, if the content block $D_1$ is missing, the core engine can rebuild the content block $D_1$ by retrieving the three parity blocks and performing the following operation:

$$D_1 = P_{1,2,3} \oplus P_{N-1,N,1} \oplus P_{N,1,2}$$

Figure 5D:
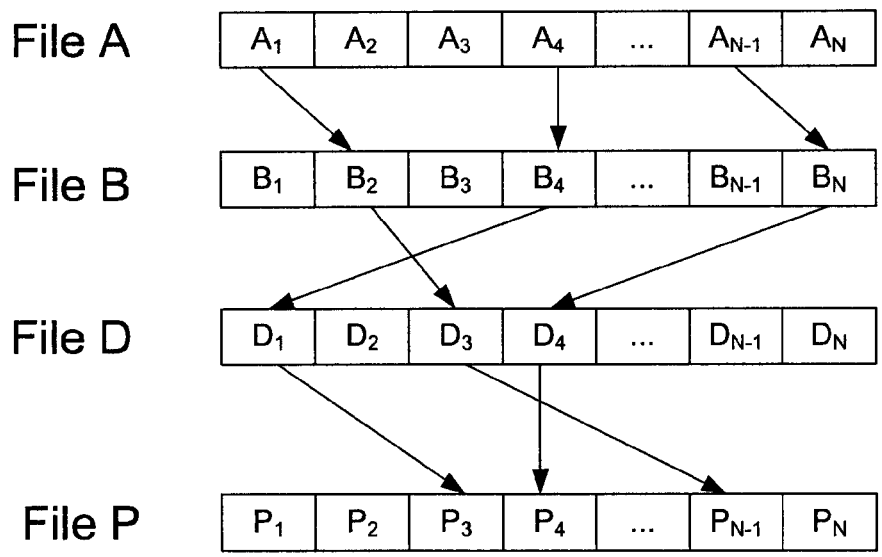
FIG. 5D is a block diagram illustrating an inter-file parity computation scheme according to some embodiments.

FIG. 5D is a block diagram illustrating an inter-file parity computation scheme according to some embodiments. In this example, the file D is the target file that requires parity protection. Files A and B are two files that readily accessible to a user and they are not necessarily part of the virtual file system. In order to compute the parity blocks, both the files A and B are partitioned into multiple blocks and different blocks from different files are combined by "the exclusive or" operation to generate the parity blocks that are part of the parity file P, e.g., $$P_3 = A_4 \oplus B_4 \oplus D_1$$

$$P_4 = A_{N-1} \oplus B_N \oplus D_4$$

$$\ldots$$

$$P_{N-1} = A_1 \oplus B_2 \oplus D_3$$

Because both the files A and B are readily available to the virtual file system, the core engine only need to retrieve a corresponding parity block from the parity file P in order to recover a block missing from the file D. For example, assuming that the content block $D_1$ is missing, the core engine can rebuild the missing content block by performing the following operation:

$$D_1 = P_3 \oplus A_4 \oplus B_4$$

Note that the two parity computation schemes are for illustrative purpose. Those skilled in the art can develop other schemes based on the teachings herein.

FIGS. 6A to 6D are block diagrams illustrating multiple stages of an exemplary commit tree according to some embodiments. As described above, the commit tree is used for tracking the changes to the virtual file system by adding new tree branches at different times. The four block diagrams in FIGS. 6A to 6D are similar to four snapshots of the virtual file system at the four different moments. Note that the commit tree is simplified for illustrating the basic structures of and operations applied to a commit. One skilled in the art would understand that the commit tree corresponding to an actual virtual system would be much more complex.

Figure 6A:
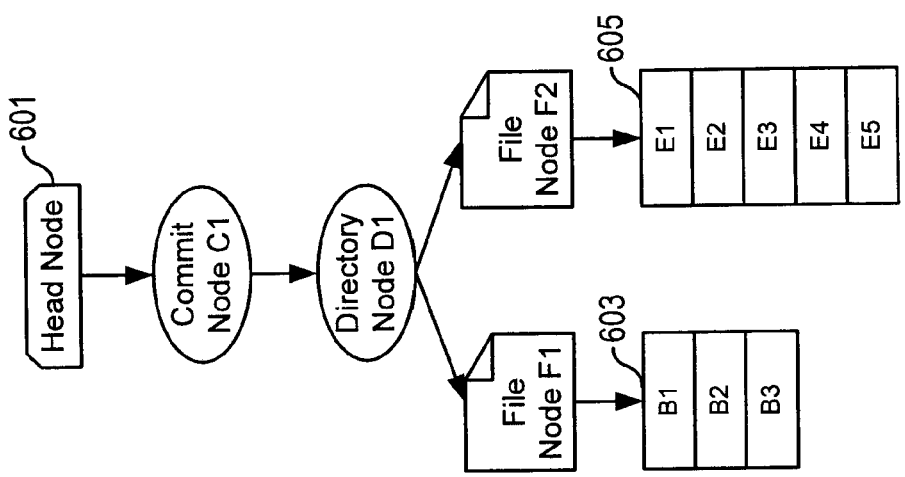
FIGS. 6A to 6E are block diagrams illustrating multiple stages of an exemplary commit tree according to some embodiments.

As shown in FIG. 6A, the commit tree at the moment of $T_1$ has one tree branch lead by the head node 601. In some embodiments, the commit tree always has a head node that points to the most recent commit node (which is commit node C1 in FIG. 6A). The commit node C1 references one directory node D1 and the direct node D1 references two file nodes F1 and F2, each file node having an associated block catalog (603 or 605). In other words, the virtual file system (or a particular data volume) identified by the commit tree has two files.

Figure 6B:
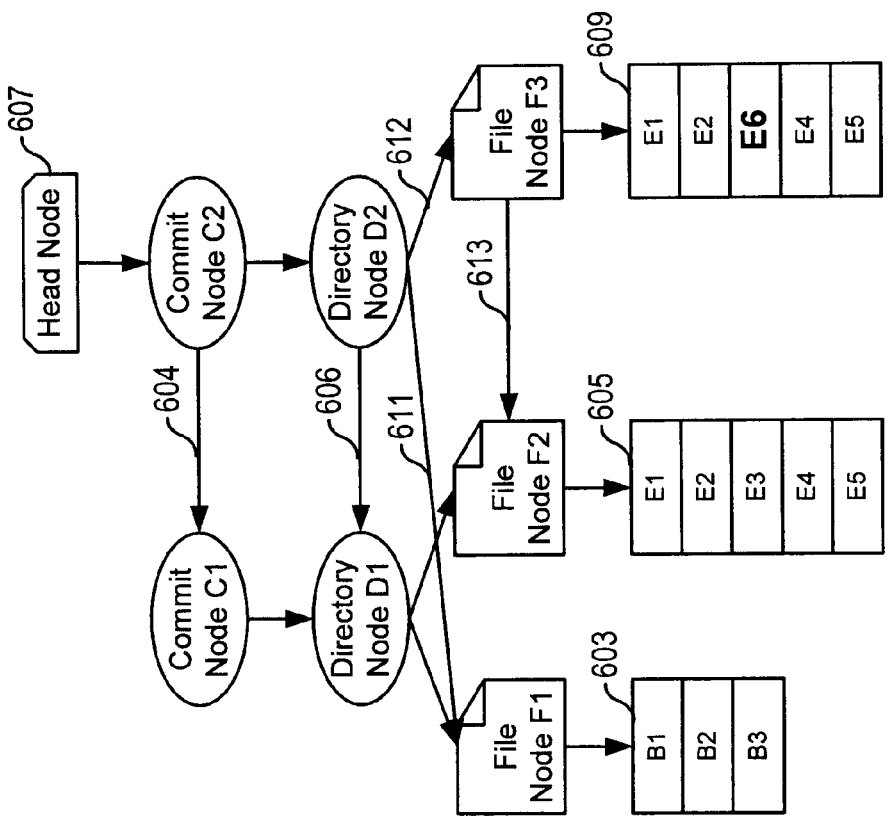

FIG. 6B depicts the commit tree at the moment of $T_2$, which adds one tree branch to the commit tree. Note that the head node 607 references the commit node C2, which is the most recent commit node. Both the commit node C2 and the directory node D2 have references (604, 606) to their respective predecessor commit node C1 and directory node D1. The directory node D2 has a reference 611 to the file node F1 and a reference 612 to the file node F3. In other words, from $T_1$ to $T_2$, the file associated with the file node F1 remains unchanged. But the file associated with the file node F2 has been changed. At the moment of $T_1$, the file associated with the file node F2 has five content blocks E1 to E5. At the moment of $T_2$, the file associated with the file node F2 still has five content blocks with the content block E3 replaced by the content block E6. Because the two versions of the file share the four content blocks E1, E2, E4, and E5, the second version associated with the file node F3 only has one new block ID corresponding to the new content block E6. In other words, the commit tree automatically performs differential (or delta) compression by pointing to those old blocks that have not been changes. Note that the differential compression scheme works regardless of whether the changes to the content of a file occur at the beginning of the file (e.g., within E1) or at the end of the file (e.g., within E5). Whenever the changed content block exceed the predefined block size, one or more new content blocks will be generated to deal with the content overflow.

Figure 6C:
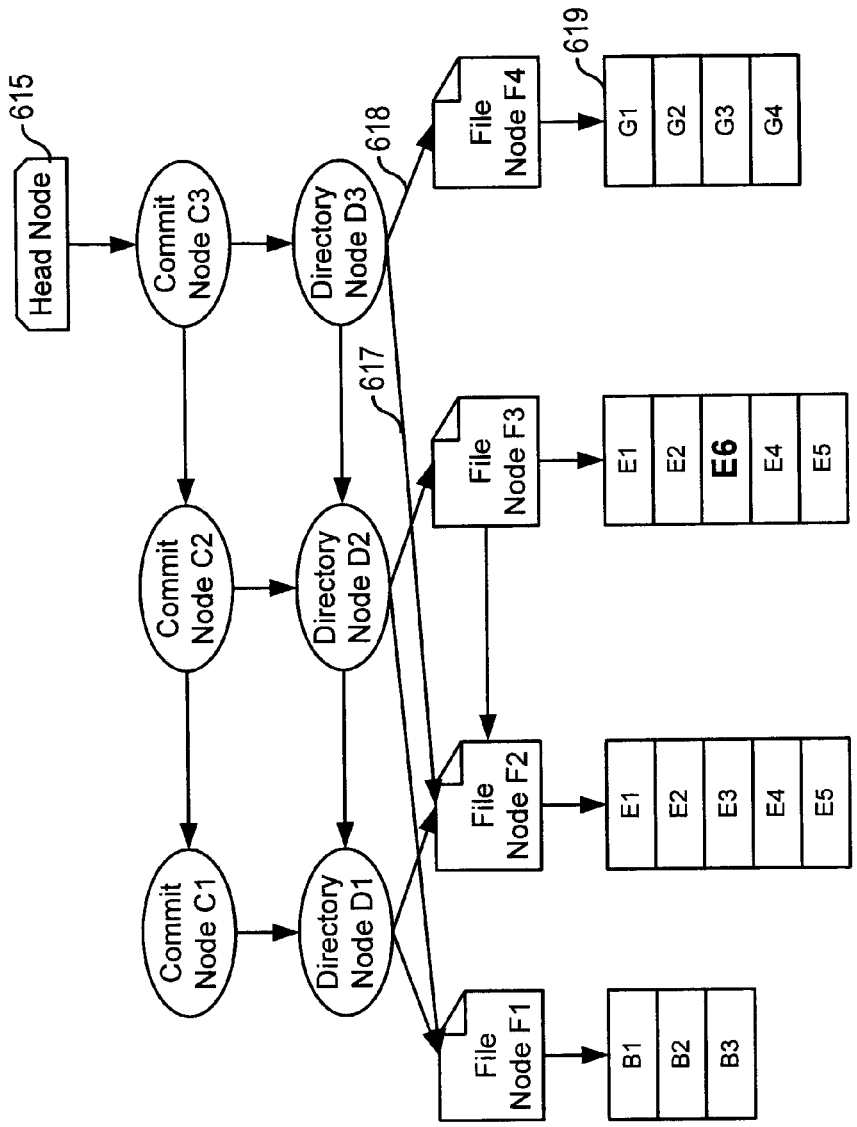

FIG. 6C depicts the commit tree at the moment of $T_3$, which adds one more tree branch to the commit tree. Note that the head node 615 now references the most recent commit node C3. The directory node D3 has a reference 617 to the file node F2 and a reference 618 to the file node F4. In other words, between $T_2$ and $T_3$, the virtual file system has reverted back to the earlier version of the file associated with the file node F2. For example, a user of the virtual file system may decide to delete the later version of the file associated with the file node F3. In addition, a new file associated with the file node F4 is added to the virtual file system and it has a block catalog 619.

Figure 6D:
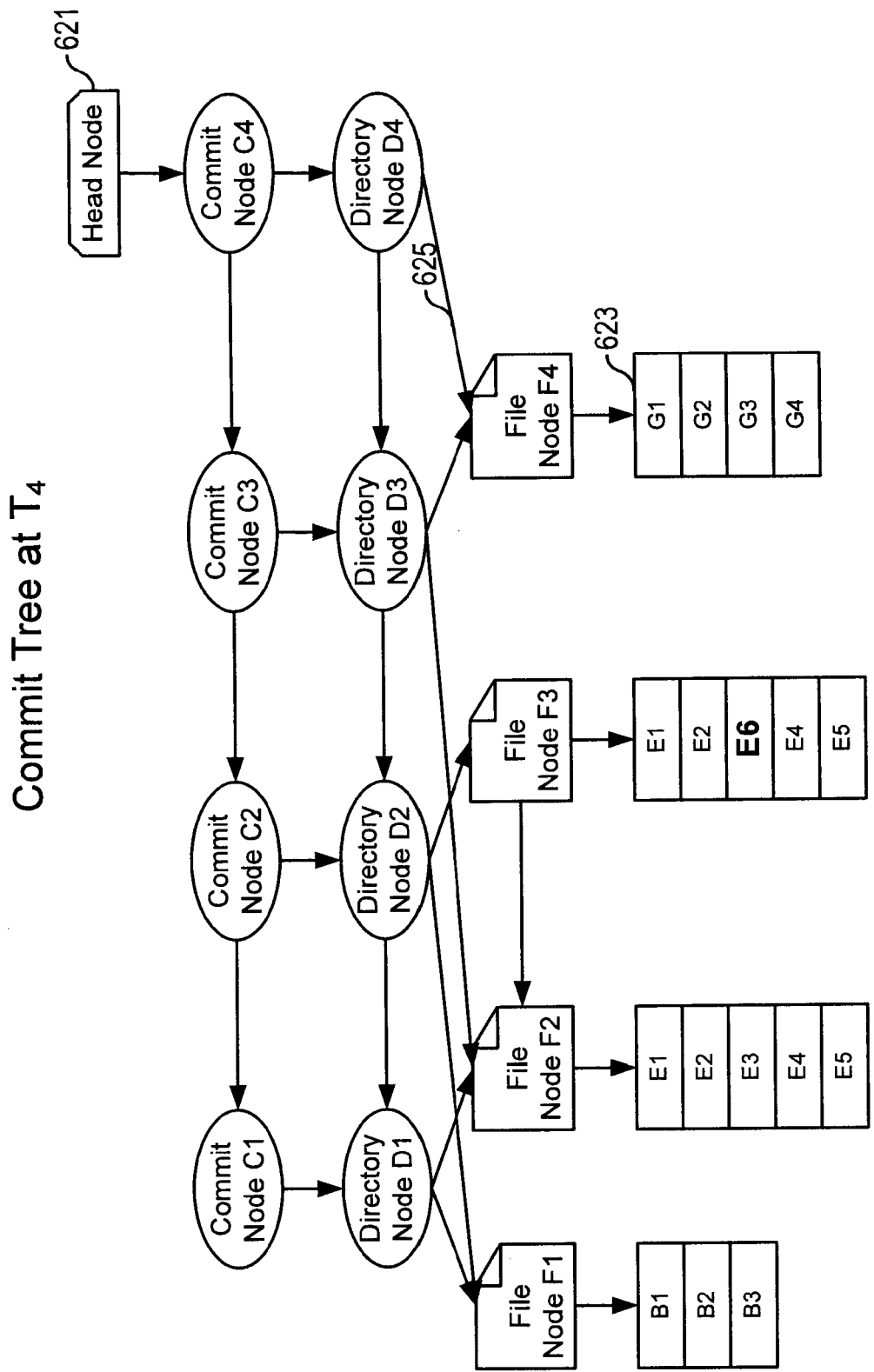

FIG. 6D depicts the commit tree at the moment of $T_4$ when another tree branch lead by the head node 612 is added to the commit tree. Note that the directory node D4 has only one file reference 625 to the file node F4, suggesting that the virtual file system has deleted other files referenced by the directory node D3 but kept only the file associated with the file node F4.

In some embodiments, the virtual file system is required to enable a user to access a set of files residing in the storage cloud (especially those remote storage devices) from different geographical locations. Note that the user may be the same person who accesses the set of files using different computing devices or different persons who access the set of files using different computing devices. To meet this requirement, the virtual file system needs to have a mechanism to resolve potential conflicts between the updates to the set of files from different computing devices.

Figure 6E:
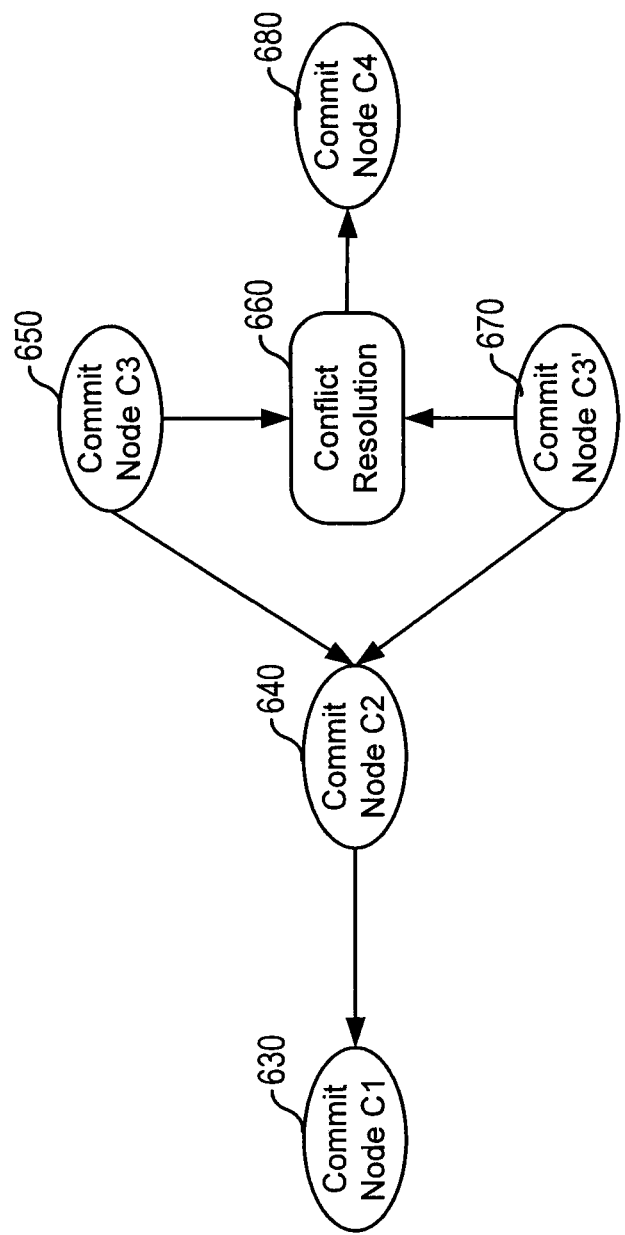

FIG. 6E depicts how the virtual file system resolves potential conflicts between different revisions to a virtual file system according to some embodiments. For simplicity, the diagram in FIG. 6E focuses on the commit nodes corresponding to different revisions to the virtual file system. As noted above, the first revision is made at the moment of $T_1$ and represented by the commit node C1; and the second revision is made at the moment of $T_2$ and represented by the commit node C2. Note that there is no conflict for the first two revisions because both revisions to the virtual file systems are synchronized with the storage cloud such that a file stored in the storage cloud (in the form of blocks) are the same as the file stored at the virtual file system's local file system cache. Then, at the moments of $T_3$ and $T_{3'}$, two users independently make changes to the same revision of the virtual file system from their respective computing devices by, e.g., adding new files to the virtual file system, deleting existing files from the virtual file system, or modifying existing files in the virtual file system. As a result, two different commit nodes C3 and C3' are generated at the two computing devices from which the changes to the virtual file system were made. This situation may occur when the two users are the virtual file system in an offline mode.

Subsequently, when one of the two users (e.g., the user who generates the commit node C3) first synchronizes its virtual file system with the storage cloud, the new commit node C3 will be sent to the storage cloud to replace the commit node C2 as the virtual file system's current commit node. But when another user (e.g., the user who generates the commit node C3') subsequently synchronizes its virtual file system with the storage cloud, a potential conflict may occur because the commit node C3' still references the commit node C2 within the virtual file system whereas the metadata returned from the storage cloud (e.g., at step 307 of FIG. 3A) may indicate that there is another commit node C3 referencing the commit node C2 (note that the other user has no prior knowledge of the commit node C3). In this case, the virtual file system may initiate a conflict resolution process to merge the revision of the virtual file system corresponding to the commit node C3 with the revision of the virtual file system corresponding to the commit node C3'.

In some embodiments, the virtual file system's configuration policy may specify a set of rules on how to resolve conflicts between two different revisions. One exemplary rule is that, for certain types of files, the virtual file system may automatically choose one of the two revisions over the other one. For example, the chosen one may be the one that has a more recent time stamp. Another exemplary rule is that a file only introduced into one of the two revisions should be retained in the merged revision (as represented by the commit node C4). Yet another exemplary rule is that a file only removed from one of the two revisions should be kept in the merged revision as long as such operation does not cause any other information loss to the virtual file system.

In some embodiments, both revisions may have a modified version of the same file of different contents. In this case, the virtual file system may identify the file and raise an alert to the user by, e.g., generating a pop-up window or adding a special mark to the file in the virtual file system to indicate that two different contents may exist for the same file. When a user clicks a link/button in the pop-up window or the file, the virtual file system will invoke an application to open both versions of the same file in two separate windows so that the user can manually merge the two contents into one content. In some embodiments, the application is configured to highlight the content differences between the two versions to help the user to choose one over the other one or neither of the two by providing a new one. At the end of the conflict resolution process, a new commit node C4 is generated as the current commit node of the virtual file system. Note that the rules described above are applicable not only to a file but also to files or directories or even the entire virtual file system.

Figure 7:
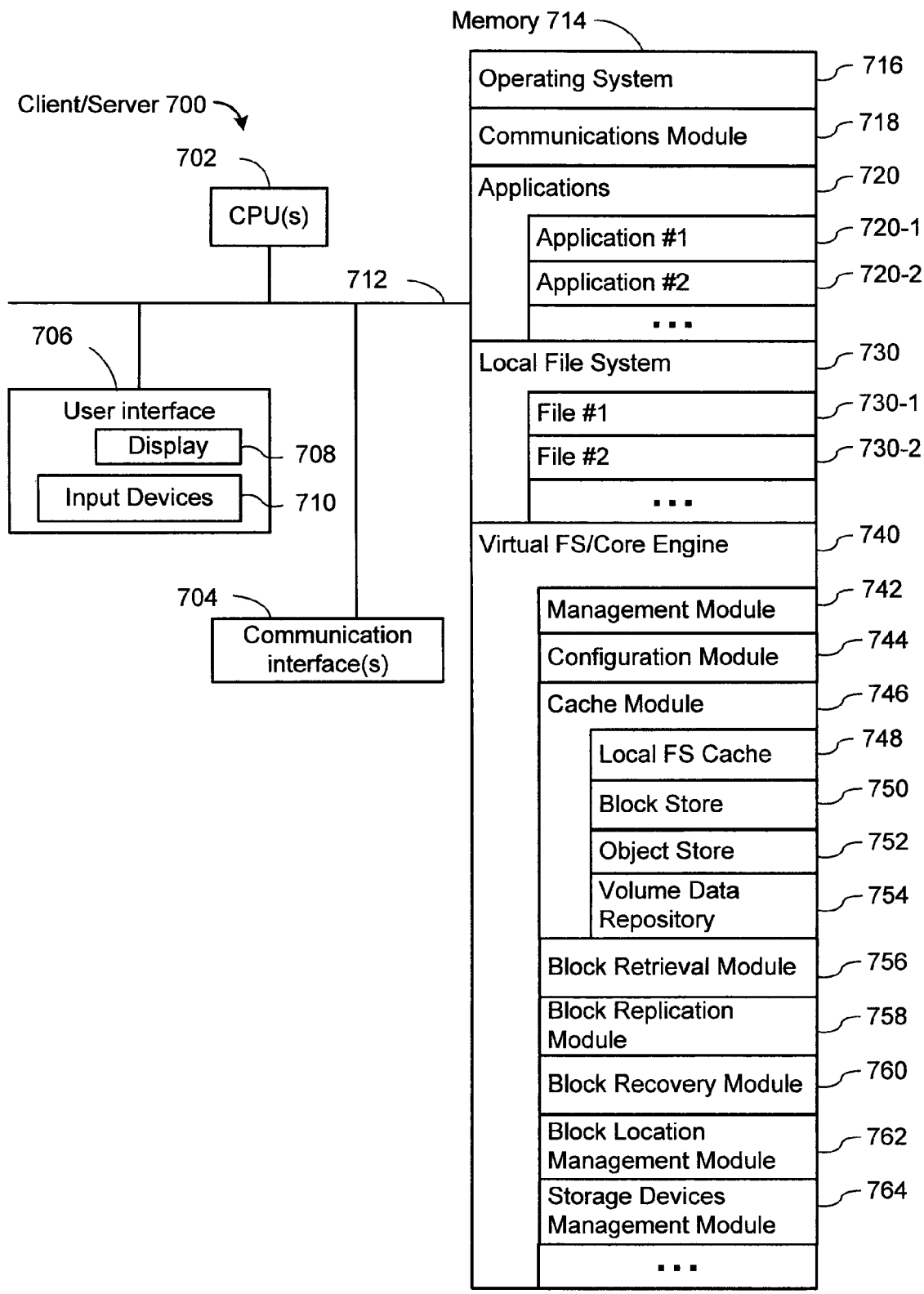
FIG. 7 is a block diagram illustrating a client or server device equipped with a virtual file system according to some embodiments.

FIG. 7 is a block diagram illustrating a client or server device equipped with a virtual file system used for operations described above according to some embodiments. A client or server computer 700 that runs the virtual file system typically includes one or more processing units (CPU's) 702 for executing modules, programs and/or instructions stored in memory 714 and thereby performing processing operations; one or more network or other communications interfaces 704; memory 714; and one or more communication buses 712 for interconnecting these components. In some embodiments, a client or server computer 700 includes a user interface 706 comprising a display device 708 and one or more input devices 710. In some embodiments, memory 714 includes high-speed random access memory, such as DRAM, SRAM, DDR RAM or other random access solid state memory devices. In some embodiments, memory 714 includes non-volatile memory, such as one or more magnetic disk storage devices, optical disk storage devices, flash memory devices, or other non-volatile solid state storage devices. In some embodiments, memory 714 includes one or more storage devices remotely located from the CPU(s) 702. Memory 714, or alternately the non-volatile memory device(s) within memory 714, comprises a computer readable storage medium. In some embodiments, memory 714 or the computer readable storage medium of memory 714 stores the following programs, modules and data structures, or a subset thereof:

- an operating system 716 that includes procedures for handling various basic system services and for performing hardware dependent tasks;
- a communications module 718 that is used for connecting the client or server computer 700 to other computers via the one or more communication network interfaces 704 (wired or wireless) and one or more communication networks 712, such as the Internet, other wide area networks, local area networks, metropolitan area networks, and so on;
- one or more applications 720, such as an application 720-1 for playing video streams and an application 720-1 for document editing;
- a local file system 730 that manages one or more files 730-1, 730-2;
- a virtual file system supported by a core engine 740 that includes a management module 742, a configuration module 744, a cache module 746 that further includes a local file system cache 748, a block store 750, an object store 752, and a volume data repository 754;
- a block retrieval module 756 for retrieving blocks from different storage devices;
- a block replication module 758 for implementing the virtual file system's data redundancy policy (e.g., generating parity data);
- a block recovery module 760 for recovering a missing block using, e.g., parity data;
- a block location management module 762 for tracking the location of each block and the corresponding adapter for accessing the block; and
- a storage devices management module 764 for managing the retrieval and synchronization operations between the virtual file system and the storage devices.

Note that a more detailed description of the above identified elements has been provided above in connection with FIG. 1D. Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 714 may store a subset of the modules and data structures identified above. Furthermore, memory 714 may store additional modules or data structures not described above.

Although FIG. 7 shows an instance server used for performing various operations in connection with the operation of the virtual file system as illustrated above, FIG. 7 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 7 could be implemented on individual computer systems and single items could be implemented by one or more computer systems. The actual number of computers used to implement each of the operations, or the storage devices, and how features are allocated among them will vary from one implementation to another, and may depend in part on the amount of data at each instance of virtual file system, the amount of data traffic that a virtual file system must handle during peak usage periods, as well as the amount of data traffic that a virtual file system must handle during average usage periods.

Figure 8A:
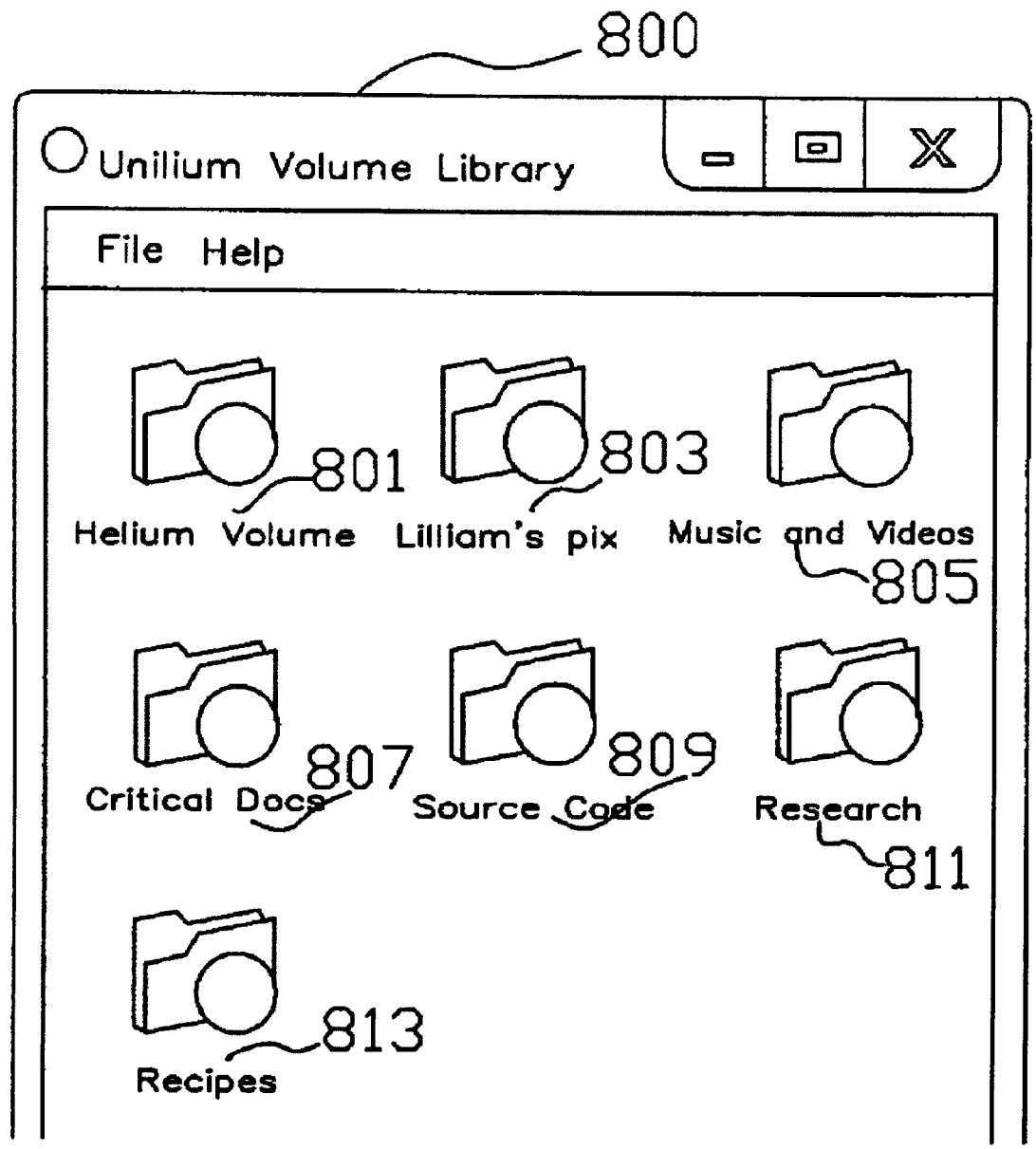
Figure 8B:
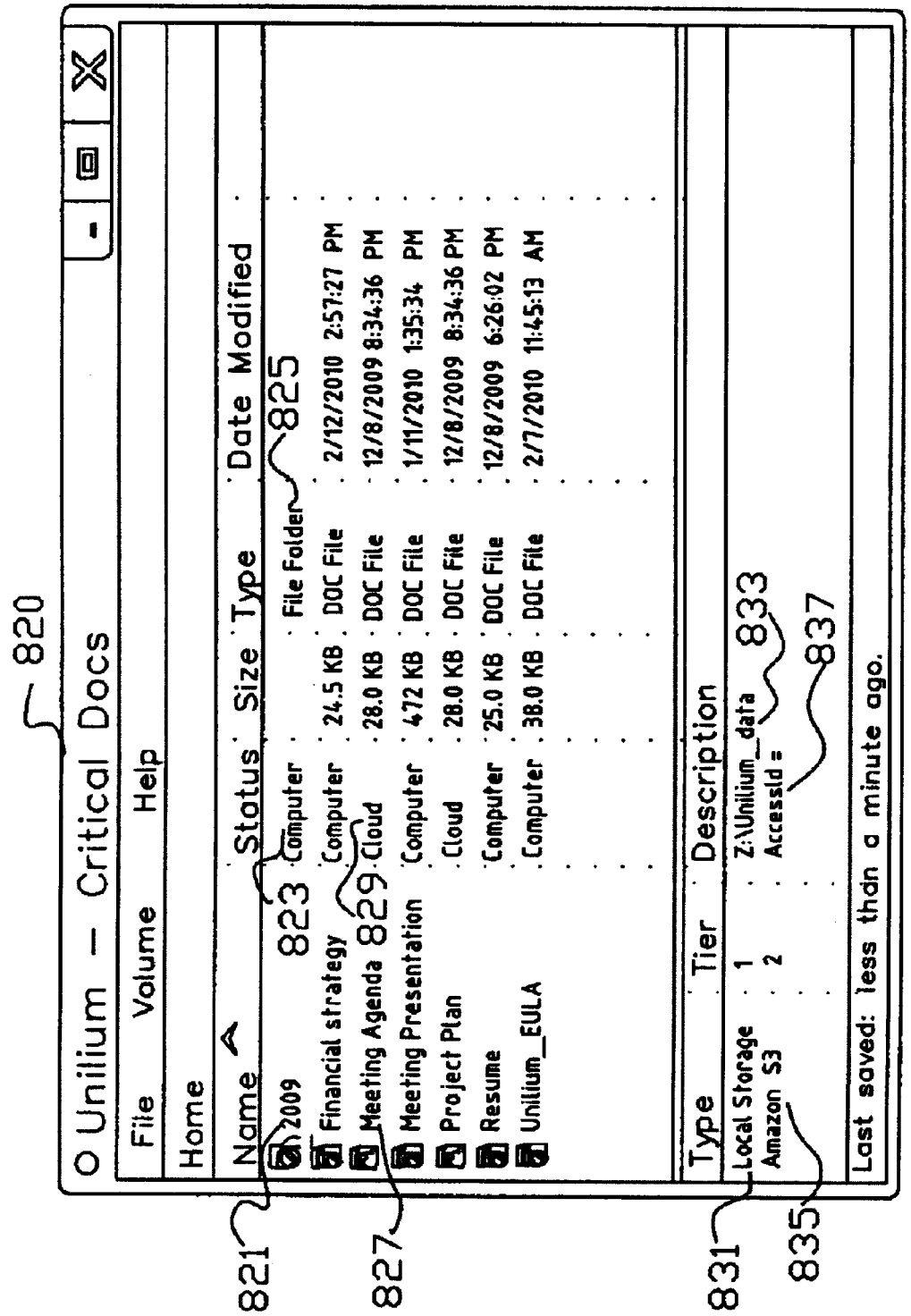

FIGS. 8A to 8F are exemplary screenshots of a virtual file system according to some embodiments. In particular, FIG. 8A depicts a window corresponding to the virtual file system 800 running at a computing device. The virtual file system 800 includes multiple data volumes, each data volume having a particular icon in the window. A user can access files associated a particular data volume by clicking on the corresponding icon in the window. For example, FIG. 8B depicts a window corresponding to the data volume 820 after a user selection of the icon 807 in FIG. 8A. For illustration, the data volume 820 includes a directory 821 with a title "2009" and a type "File Folder" 825. The status 823 of the directory is "computer," which means that the directory 821's structure has been rebuilt at the computing device's local file system. In addition, the data volume 820 includes multiple DOC files, one of which is a file 827 having a title "Meeting Agenda." The status 829 of the file is "cloud," which means that the file 827's content is located at one or more storage devices within the storage cloud and has not been rebuilt at the computing device's local file system. The lower portion of the window in FIG. 8B depicts the storage devices (or services) that support the data volume 820. In this example, the data volume 820 has two storage devices, a local storage 831 having a description 833 (which is a directory at the local file system) and a remote cloud storage service offered by Amazon.

Figure 8F:
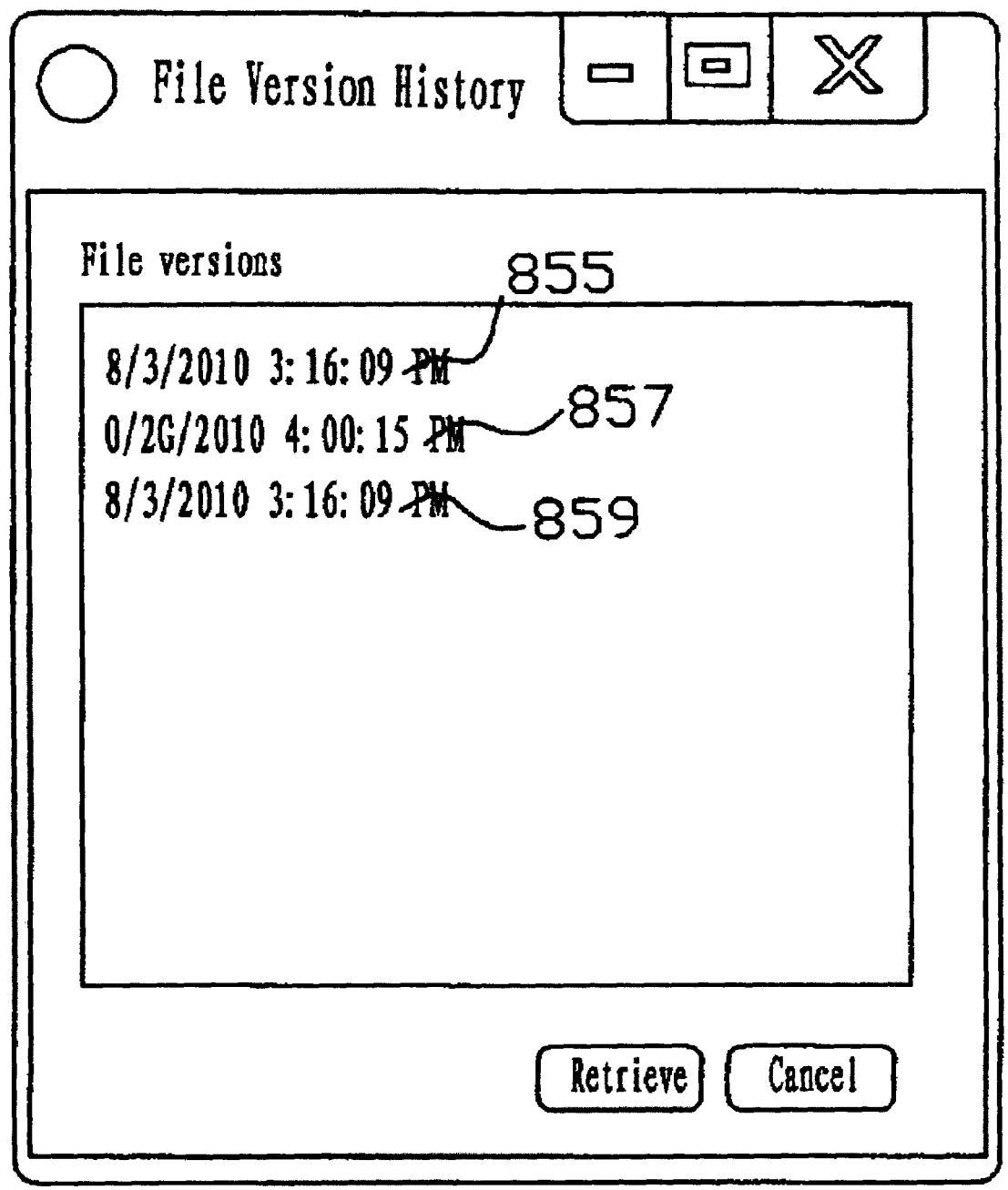

FIG. 8C depicts that the virtual file system includes two newly added files 841, 843. Note that the status of the two files are "added" and each file icon has a "+" sign, indicating that the two files have not yet been pushed into any of the two storage devices 842, 844. FIG. 8D depicts the virtual file system after both files 845, 847 have been pushed into the storage cloud. As a result, the status of the two files change from "added" to "computer," indicating that the two files are available in the local file system cache as well as in the storage cloud and the two sides are in sync. FIG. 8E depicts the virtual file system after the file 853 is deleted from the local file system cache. Note that the status of the file 851 remains to be "computer" whereas the status of the file 853 changes from "computer" to "cloud," indicating that the file 853 is only available in the storage cloud. FIG. 8F depicts the version history of an exemplary file. In this example, the file has two versions with different timestamps. Note that the current version 855 is the same as the oldest version 859, indicating that the virtual file system enables a user to bring back any old version of a file (or even a directory) as the current version for further processing.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a computing device:
   receiving, from an application, a request for a file associated with an instance of a virtual file system, wherein the file has multiple revisions and the request identifies a particular revision to the file and the virtual file system includes metadata of the multiple revisions to the requested file;
   creating a commit tree based on metadata blocks associated with the particular revision of the virtual file system and wherein the particular revision to the requested file is associated with a file node of the commit tree, wherein the commit tree includes all subsequent operations of the file;
   checking the metadata to identify a first set of data blocks of the particular revision to the requested file that is not present at the computing device, further including looking up the commit tree associated with the instance of the virtual file system for location information of the first set of data blocks associated with the particular revision to the requested file, wherein the commit tree includes multiple branches, each branch having an associated list of block identifiers corresponding to a respective revision to the file and a file revision identifier referencing an earlier revision to the file, and looking up the commit tree including laterally traversing the multiple branches using respective file revision identifiers until a list of block identifiers corresponding to the first set of data blocks of the particular revision to the requested file is identified, wherein the checking the metadata includes identifying a second set of data blocks of the particular revision to the requested file that is already present at the computing device;
   retrieving the first set of data blocks from at least one of a plurality of storage devices associated with the virtual file system using the identified list of block identifiers corresponding to the first set of data blocks of the particular revision to the requested file and in accordance with the location information of the first set of data blocks;
   generating a copy of the particular revision to the requested file using the retrieved first set of data blocks, wherein the generating a copy of the particular revision to the requested file includes merging the first set of data blocks of the particular revision to the requested file with the second set of data blocks, wherein the merging further includes replacing an old data block in the second set with a new data block in the first set if the new data block includes at least one update to the old data block;
   and returning the generated copy of the particular revision to the requested file to the requesting application.

2. The computer-implemented method of claim 1, wherein the metadata of the requested file was retrieved from at least one of the plurality of storage devices during the instantiation of the virtual file system at the computing device.

3. The computer-implemented method of claim 1, wherein the particular revision to the requested file is associated with a file node of the commit tree.

4. The computer-implemented method of claim 3, wherein the commit tree includes a plurality of commit tree branches, each commit tree branch corresponding to a respective revision of the virtual file system.

5. The computer-implemented method of claim 4, wherein a respective commit tree branch includes at least a commit node, a directory node, and a file node, and the commit tree branch is configured such that the commit node includes a reference to the directory node and the directory node includes a reference to the file node.

6. The computer-implemented method of claim 4, wherein a respective commit tree branch includes at least one reference to another commit tree branch and the two commit tree branches correspond to two consecutive revisions of the virtual file systems.

7. The computer-implemented method of claim 6, wherein there is at least one difference between the two consecutive revisions of the virtual file systems.

8. The computer-implemented method of claim 1, wherein checking the metadata includes identifying a second set of data blocks of the particular revision to the requested file that is already present at the computing device.

9. The computer-implemented method of claim 8, wherein at least one of the second set of data blocks is part of a file associated with the virtual file system that is different from the particular revision to the requested file.

10. The computer-implemented method of claim 8, wherein at least one of the second set of data blocks is part of an old version of the particular revision to the requested file.

11. The computer-implemented method of claim 1, wherein generating a copy of the particular revision to the requested file includes updating the metadata of the particular revision to the requested file in the commit tree in accordance with the retrieved first set of data blocks at the computing device.

12. The computer-implemented method of claim 11, wherein the commit tree has one or more commit tree branches, each commit tree branch having at least one commit node, at least one directory node, and at least one file node, and the particular revision to the requested file is associated with a file node of a respective commit tree branch, and updating the metadata of the particular revision to the requested file includes updating the file node, the directory node, and the commit node of the respective commit tree branch in accordance with the retrieved first set of data blocks at the computing device.

13. The computer-implemented method of claim 1, wherein the plurality of storage devices include at least one storage device remote from the computing device that is associated with a cloud storage service provided by a third party.

14. The computer-implemented method of claim 1, wherein retrieving the first set of data blocks includes:
   selecting an adapter for a respective storage device that has one or more of the first set of data blocks; and
   causing the selected adapter to issue one or more requests for the data blocks stored at the respective storage device.

15. The computer-implemented method of claim 1, wherein the computing device is one selected from the group consisting of a desktop computer, a laptop computer, a tablet computer, and a mobile telephone.

16. The computer-implemented method of claim 1, wherein the computing device has a local file system and the local file system includes directories and files associated with the virtual file system.

17. The computer-implemented method of claim 16, wherein a total size of the local file system is less than a total size of the virtual file system.

18. A computing device, comprising:
one or more processors; memory; and
one or more programs stored in the memory for execution by the one or more processors, the one or more programs comprising instructions for:
receiving, from an application, a request for a file associated with an instance of a virtual file system, wherein the file has multiple revisions and the request identifies a particular revision to the file and the virtual file system includes metadata of the multiple revisions to the requested file;
creating a commit tree based on metadata blocks associated with the particular revision of the virtual file system and wherein the particular revision to the requested file is associated with a file node of the commit tree, wherein the commit tree includes all subsequent operations of the file;
checking the metadata to identify a first set of data blocks of the particular revision to the requested file that is not present at the computing device, further including looking up the commit tree associated with the instance of the virtual file system for location information of the first set of data blocks associated with the particular revision to the requested file, wherein the commit tree includes multiple branches, each branch having an associated list of block identifiers corresponding to a respective revision to the file and a file revision identifier referencing an earlier revision to the file, and looking up the commit tree including laterally traversing the multiple branches using respective file revision identifiers until a list of block identifiers corresponding to the first set of data blocks of the particular revision to the requested file is identified, wherein the checking the metadata includes identifying a second set of data blocks of the particular revision to the requested file that is already present at the computing device;
retrieving the first set of data blocks from at least one of a plurality of storage devices associated with the virtual file system using the identified list of block identifiers corresponding to the first set of data blocks of the particular revision to the requested file and in accordance with the location information of the first set of data blocks;
generating a copy of the particular revision to the requested file using the retrieved first set of data blocks, wherein the generating a copy of the particular revision to the requested file includes merging the first set of data blocks of the particular revision to the requested file with the second set of data blocks, wherein the merging further includes replacing an old data block in the second set with a new data block in the first set if the new data block includes at least one update to the old data block; and
returning the generated copy of the particular revision to the requested file to the requesting application.

19. A non-transitory computer readable storage medium storing one or more programs configured for execution by a computing device having one or more processors and memory storing one or more programs for execution by the one or more processors, the one or more programs comprising instructions to:
receive, from an application, a request for a file associated with an instance of a virtual file system, wherein the file has multiple revisions and the request identifies a particular revision to the file and the virtual file system includes metadata of the multiple revisions to the requested file;
creating a commit tree based on metadata blocks associated with the particular revision of the virtual file system and wherein the particular revision to the requested file is associated with a file node of the commit tree, wherein the commit tree includes all subsequent operations of the file;
check the metadata to identify a first set of data blocks of the particular revision to the requested file that is not present at the computing device, further including looking up the commit tree associated with the instance of the virtual file system for location information of the first set of data blocks associated with the particular revision to the requested file, wherein the commit tree includes multiple branches, each branch having an associated list of block identifiers corresponding to a respective revision to the file and a file revision identifier referencing an earlier revision to the file, and looking up the commit tree including laterally traversing the multiple branches using respective file revision identifiers until a list of block identifiers corresponding to the first set of data blocks of the particular revision to the requested file is identified, wherein the checking the metadata includes identifying a second set of data blocks of the particular revision to the requested file that is already present at the computing device;
retrieve the first set of data blocks from at least one of a plurality of storage devices associated with the virtual file system using the identified list of block identifiers corresponding to the first set of data blocks of the particular revision to the requested file and in accordance with the location information of the first set of data blocks;
generate a copy of the particular revision to the requested file using the retrieved first set of data blocks, wherein the generating a copy of the particular revision to the requested file includes merging the first set of data blocks of the particular revision to the requested file with the second set of data blocks, wherein the merging further includes replacing an old data block in the second set with a new data block in the first set if the new data block includes at least one update to the old data block; and
return the generated copy of the particular revision to the requested file to the requesting application.

* * * * *